(12) United States Patent
Nishikuni

(10) Patent No.: US 8,982,415 B1
(45) Date of Patent: Mar. 17, 2015

(54) GENERATING COLOR VALUE REGISTRATION LIST BASED ON NUMBER OF CONSECUTIVE PIXELS WITH MATCHING COLOR VALUES

(71) Applicant: Fuji Xerox Co., Ltd., Tokyo (JP)

(72) Inventor: Yuichi Nishikuni, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/253,332

(22) Filed: Apr. 15, 2014

(30) Foreign Application Priority Data

Oct. 10, 2013 (JP) ................. 2013-213104

(51) Int. Cl.
*H04N 1/56* (2006.01)
*G06K 15/02* (2006.01)
(52) U.S. Cl.
CPC .................. *G06K 15/1878* (2013.01)
USPC ............ 358/1.9; 358/2.1; 358/3.24; 358/501; 358/530

(58) Field of Classification Search
None
See application file for complete search history.

(56) References Cited

U.S. PATENT DOCUMENTS 8,351,691 B2 * 1/2013 Chen et al. ..................... 358/1.9

FOREIGN PATENT DOCUMENTS

| JP | A-2006-262480 | 9/2006 |
| JP | A-2011-176463 | 9/2011 |

* cited by examiner

*Primary Examiner* — Scott A Rogers
(74) *Attorney, Agent, or Firm* — Oliff PLC

(57) ABSTRACT

An image processing apparatus includes a first color value registration list generating section that generates a first color value registration list, on a basis of color values of individual pixels of inputted image information in a case where a predetermined number or more of consecutive pixels have color values that match each other, the first color value registration list registering, for each of the color values that match, first color value information that includes the color value and a frequency of the color value.

19 Claims, 29 Drawing Sheets

| RENDERING OBJECT | INFORMATION ABOUT RENDERING |
|---|---|
| CHARACTER RENDERING 1 | PROCESS AS OUTLINE DATA (TEXT) |
| CHARACTER RENDERING 2 | PROCESS AS BITMAP DATA (TEXT) |
| GRAPHICS RENDERING 1 | FILLING OF RECTANGULAR AREA (GRAPHICS) |
| GRAPHICS RENDERING 2 | RENDERING OF LINES (GRAPHICS) |
| GRAPHICS RENDERING 3 | GRADATION (GRAPHICS) |
| IMAGE RENDERING | IMAGE DATA (NATURAL IMAGE/CG IMAGE) |

FIG. 8

| ENTRY NO. | T | R | G | B | ON-PAGE FREQUENCY |
|---|---|---|---|---|---|
| 1 | 1 | 0 | 0 | 0 | 213794 |
| 2 | 2 | 255 | 128 | 128 | 2960 |
| 3 | 3 | 255 | 128 | 128 | 349862 |
| 4 | 2 | 128 | 128 | 128 | 32403 |
| 5 | 3 | 128 | 128 | 128 | 46216 |
| ... | . | ... | ... | ... | ... |
| N | . | ... | ... | ... | ... |

FIG. 9

| ENTRY NO. | T | R | G | B |
|---|---|---|---|---|
| 1 | 1 | 0 | 0 | 0 |
| 2 | 3 | 255 | 128 | 128 |
| 3 | 2 | 128 | 128 | 128 |
| 4 | 3 | 128 | 128 | 128 |

FIG. 10

| IMPORTANT COLOR NO. | T | R | G | B | TOTAL PAGE COUNT |
|---|---|---|---|---|---|
| 1 | 1 | 0 | 0 | 0 | 3026 |
| 2 | 3 | 255 | 128 | 128 | 16 |
| 3 | 2 | 128 | 128 | 128 | 694 |
| 4 | 3 | 128 | 128 | 128 | 4 |
| 5 | 1 | 255 | 0 | 0 | 279 |
| ... | . | ... | ... | ... | ... |
| M | . | ... | ... | ... | ... |

FIG. 16

| ENTRY NO. | T | R | G | B |
|---|---|---|---|---|
| 1 | 2 | 0 | 0 | 0 |
| 2 | 2 | 35 | 25 | 22 |
| 3 | 3 | 255 | 0 | 0 |
| 4 | 3 | 230 | 0 | 19 |
| 5 | 3 | 217 | 34 | 49 |
| 6 | 3 | 250 | 36 | 50 |

FIG. 17

| ENTRY NO. | T | R | G | B | COUNT VALUE |
|---|---|---|---|---|---|
| 1 | 2 | 0 | 0 | 0 | 213794 |
| 2 | 2 | 35 | 25 | 22 | 0 |
| 3 | 3 | 255 | 0 | 0 | 349862 |
| 4 | 3 | 230 | 0 | 19 | 0 |
| 5 | 3 | 217 | 34 | 49 | 46216 |
| 6 | 3 | 250 | 36 | 50 | 0 |

FIG. 19

| ENTRY NO. | T | R | G | B | PRESENCE OF COLOR VALUE |
|---|---|---|---|---|---|
| 1 | 2 | 0 | 0 | 0 | YES |
| 2 | 2 | 35 | 25 | 22 | NO |
| 3 | 3 | 255 | 0 | 0 | YES |
| 4 | 3 | 230 | 0 | 19 | NO |
| 5 | 3 | 217 | 34 | 49 | YES |
| 6 | 3 | 250 | 36 | 50 | NO |

FIG. 20

| IMPORTANT COLOR NO. | T | R | G | B | TOTAL PAGE COUNT |
|---|---|---|---|---|---|
| 1 | 2 | 0 | 0 | 0 | 3026 |
| 2 | 2 | 35 | 25 | 22 | 26 |
| 3 | 3 | 255 | 0 | 0 | 279 |
| 4 | 3 | 230 | 0 | 19 | 34 |
| 5 | 3 | 217 | 34 | 49 | 9 |
| 6 | 3 | 250 | 36 | 50 | 87 |

| ENTRY NO. | T | R | G | B | ON-PAGE FREQUENCY |
|---|---|---|---|---|---|
| 1 | 3 | 255 | 0 | 0 | 526 |
| 2 | 3 | 255 | 1 | 1 | 526 |
| 3 | 3 | 255 | 2 | 2 | 526 |
| 4 | 3 | 255 | 3 | 3 | 526 |
| ... | . | ... | ... | ... | ... |
| N | 3 | 255 | 240 | 240 | 526 |

GENERATING COLOR VALUE REGISTRATION LIST BASED ON NUMBER OF CONSECUTIVE PIXELS WITH MATCHING COLOR VALUES

CROSS-REFERENCE TO RELATED APPLICATIONS

This application is based on and claims priority under 35 USC 119 from Japanese Patent Application No. 2013-213104 filed Oct. 10, 2013.

BACKGROUND

The present invention relates to an image processing apparatus, an image forming apparatus, an image processing system, and an image processing method.

SUMMARY

According to an aspect of the invention, there is provided an image processing apparatus including a first color value registration list generating section that generates a first color value registration list, on a basis of color values of individual pixels of inputted image information in a case where a predetermined number or more of consecutive pixels have color values that match each other, the first color value registration list registering, for each of the color values that match, first color value information that includes the color value and a frequency of the color value.

BRIEF DESCRIPTION OF THE DRAWINGS

Exemplary embodiments of the present invention will be described in detail based on the following figures, wherein:

FIG. 8 illustrates an example of color value registration list;

FIG. 9 illustrates an example of color value determination list;

FIG. 10 illustrates an example of important color value list;

FIG. 16 illustrates an example of color value extraction list;

FIG. 17 illustrates an example of extracting color value registration list;

FIG. 19 illustrates an example of extracting color value determination list;

FIG. 20 illustrates an example of extracting important color value list;

DETAILED DESCRIPTION

Hereinafter, exemplary embodiments of the invention will be described in detail with reference to the figures.

<Configuration of Image Processing System According to First Exemplary Embodiment>

Figure 1:
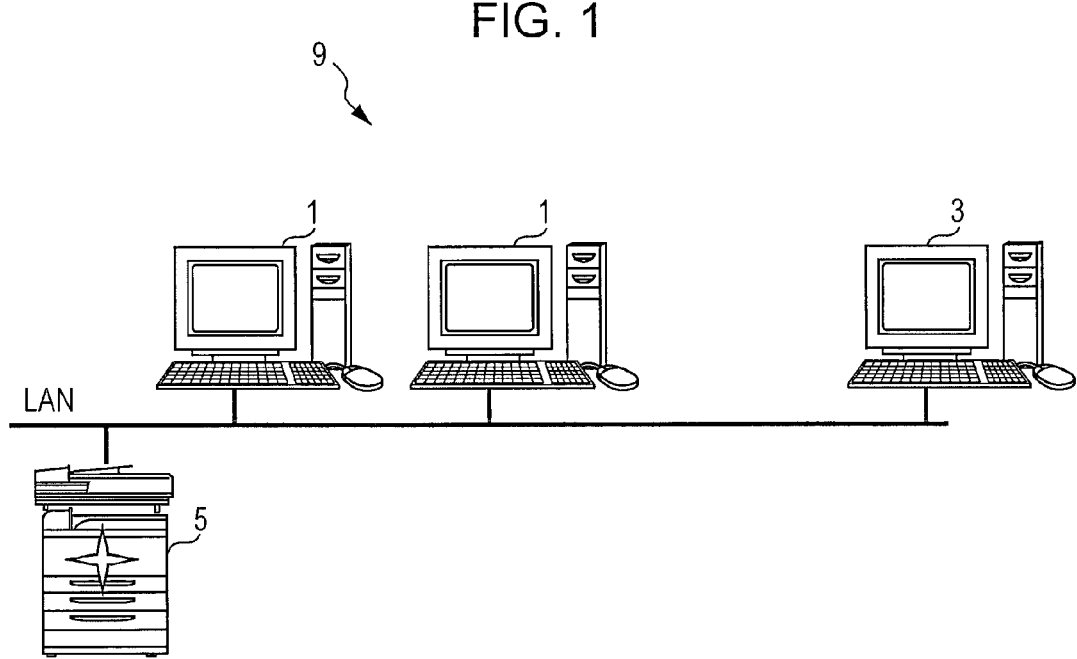
FIG. 1 illustrates a configuration of an image processing system according to a first exemplary embodiment of the invention.

First, an image processing system according to a first exemplary embodiment of the invention will be described. FIG. 1 illustrates an example of the overall configuration of the image processing system according to the first exemplary embodiment of the invention. As illustrated in FIG. 1, an image processing system 9 according to the first exemplary embodiment includes a terminal apparatus 1, a log analyzing terminal apparatus 3, and an image forming apparatus 5, which are connected to each other via a communication section.

The terminal apparatus 1 is configured by a general personal computer or the like. For example, the terminal apparatus 1 requests for changes to various settings on the image forming apparatus 5, and also instructs output of documents, graphics, and the like generated by applications (not illustrated) installed on the terminal apparatus 1.

The image forming apparatus 5 retains, as a log, information on the color value of image information included in an output instruction from the terminal apparatus 1, and forms an image on recording paper on the basis of the output instruction.

The log analyzing terminal apparatus 3 is configured by a general personal computer or the like. The log analyzing terminal apparatus 3 makes an inquiry to the image forming apparatus 5 about the presence/absence of log information on color value (hereinafter, referred to as color value log). In a case where a color value log exists, the log analyzing terminal apparatus 3 acquires the color value log stored in the image forming apparatus 5. The log analyzing terminal apparatus 3 also performs analysis by using the acquired color value log, and presents the analysis results to the user.

<Configuration of Image Forming Apparatus According to First Exemplary Embodiment>

Figure 2:
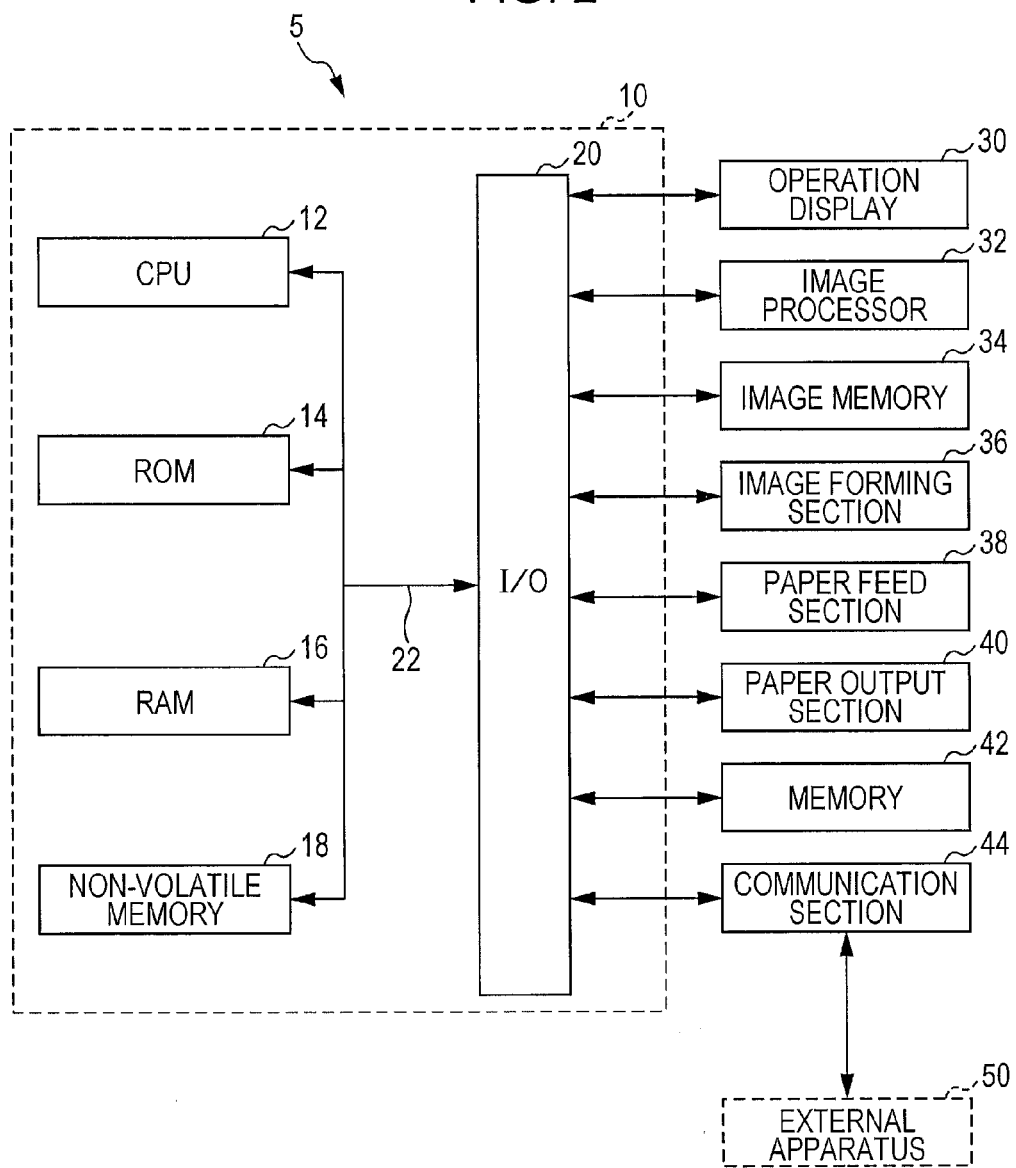
FIG. 2 is a block diagram illustrating a functional configuration of an image forming apparatus according to the first exemplary embodiment of the invention.

Next, an image forming apparatus according to the first exemplary embodiment of the invention will be described. FIG. 2 illustrates an example of the configuration of the image forming apparatus according to the first exemplary embodiment of the invention. As illustrated in FIG. 2, the image forming apparatus 5 according to the first exemplary embodiment includes a controller 10, an operation display 30, an image processor 32, an image memory 34, an image forming section 36, a paper feed section 38, a paper output section 40, a memory 42, and a communication section 44.

The controller 10 is configured as a computer that executes control of the entire apparatus and various computations. Specifically, the controller 10 includes a central processing unit (CPU) 12, a read only memory (ROM) 14 that stores various programs, a random access memory (RAM) 16 that is used as a work area when programs are executed, a non-volatile memory 18 that stores various information, and an input/output interface (I/O) 20. Each of the CPU 12, the ROM 14, the RAM 16, the non-volatile memory 18, and the I/O 20 is connected via a bus 22.

Each of the operation display 30, the image processor 32, the image memory 34, the image forming section 36, the paper feed section 38, the paper output section 40, the memory 42, and the communication section 44 is connected to the I/O 20 of the controller 10. The controller 10 exchanges information with each of the operation display 30, the image processor 32, the image memory 34, the image forming section 36, the paper feed section 38, the paper output section 40, the memory 42, and the communication section 44, and controls each of these sections.

The operation display 30 includes various buttons such as a Start button or a ten key, a warning button, a touch panel for display various screens such as a warning screen and settings screen, and the like. The operation display 30 configured in this way accepts an operation from the user, and also displays various information to the user.

The image processor 32 applies predetermined image processing to image information included in an output instruction acquired via the communication section 44 from an external apparatus 50, and generates image information to be outputted to the image forming section 36. For example, the image processor 32 expands PDL data described in a page description language, converts the resulting data into raster data (RGB data) expanded into RGB colors, and applies color conversion to the RGB data to thereby generate YMCK data or the like expressed in colors to be reproduced by the image forming apparatus. Further, the image processor 32 may perform processing such as screening or γ-correction. The image processor 32 also generates, for each page, a color value log of image information included in an output instruction acquired via the communication section 44 from the external apparatus 50. The image processor is an example of image processing apparatus.

The image memory 34 stores various image information acquired by the image forming apparatus 5, such as image information included in an output instruction acquired via the communication section 44 from the external apparatus 50, and image information generated in the image processor 32. In the first exemplary embodiment, the image memory 34 stores at least image formation that has undergone image processing in the image processor 32, that is, image information that is to be outputted to the image forming section 36.

The image forming section 36 forms an image on paper on the basis of image information stored in the image memory 34 to which image processing has been applied in the image processor 32 and outputs the paper with the formed image to the paper output section 40. For example, in a case where an image is to be formed by electrophotography, the image forming section 36 includes an image forming unit, a fixing device, and the like. The image forming unit includes a photoconductor drum, a charging device, an exposure device, a developing device, a transfer device, a cleaning device, and the like.

Now, a brief description will be given of how an image is formed by the electrophotography method. The photoconductor drum is charged by the charging device. The exposure device exposes the charged photoconductor drum to light corresponding to an image. As a result, an electrostatic latent image corresponding to an image is formed on the photoconductor drum. The developing device develops the electrostatic latent formed on the photoconductor drum with toner. The transfer device transfers the resulting toner image formed on the photoconductor drum to paper. The fixing device fixes the transferred toner image onto the paper.

The paper feed section 38 includes a paper accommodating section in which recording paper is accommodated, a feed mechanism that feeds recording paper from the paper accommodating section to the image forming section 36, and the like.

The paper output section 40 includes an output section to which recording paper is outputted, an output mechanism for outputting recording paper on which an image has been formed by the image forming section 36 onto the output section, and the like.

The memory 42 includes a memory device such as a hard disk. Various data, various programs, and the like are stored in the memory 42. The communication section 44 is an interface for communicating with the external apparatus 50 via a wired or wireless communication line. For example, the communication section 44 acquires image formation information from the external apparatus 50, together with an image formation instruction or image information of an electronic document. Image formation information includes parameters indicative of pages, the numbers of copies, and attributes such as color mode.

For example, in the first exemplary embodiment, control programs for processing described later are stored into the memory 42 in advance, and executed as the CPU 12 reads the control program stored in advance. Alternatively, control programs may be recorded on a storage memory such as a CD-ROM, and executed by being read by a CD-ROM drive or the like. Alternatively, control programs may be acquired by the communication section 44 and executed.

<Configuration of Image Processor According to First Exemplary Embodiment>

Figure 3:
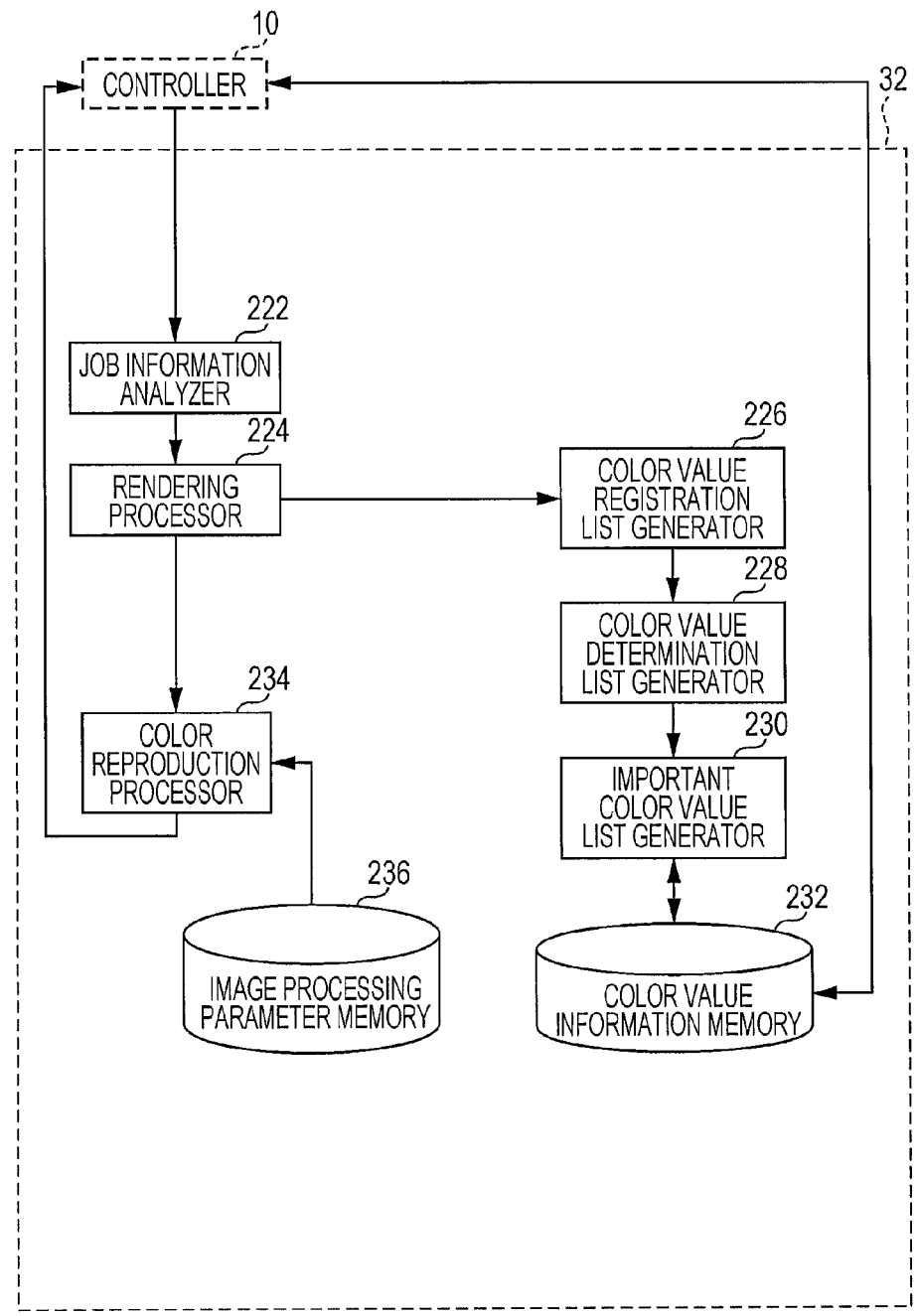
FIG. 3 is a block diagram illustrating a functional configuration of an image processor according to the first exemplary embodiment of the invention.

Next, an image processor according to the first exemplary embodiment of the invention will be described. FIG. 3 illustrates an example of the configuration of the image processor according to the first exemplary embodiment of the invention. As illustrated in FIG. 3, the image processor 32 according to the first exemplary embodiment includes a job information analyzer 222, a rendering processor 224, a color value registration list generator 226, a color value determination list generator 228, an important color value list generator 230, a color value information memory 232, a color reproduction processor 234, and an image processing parameter memory 236.

Figure 4:
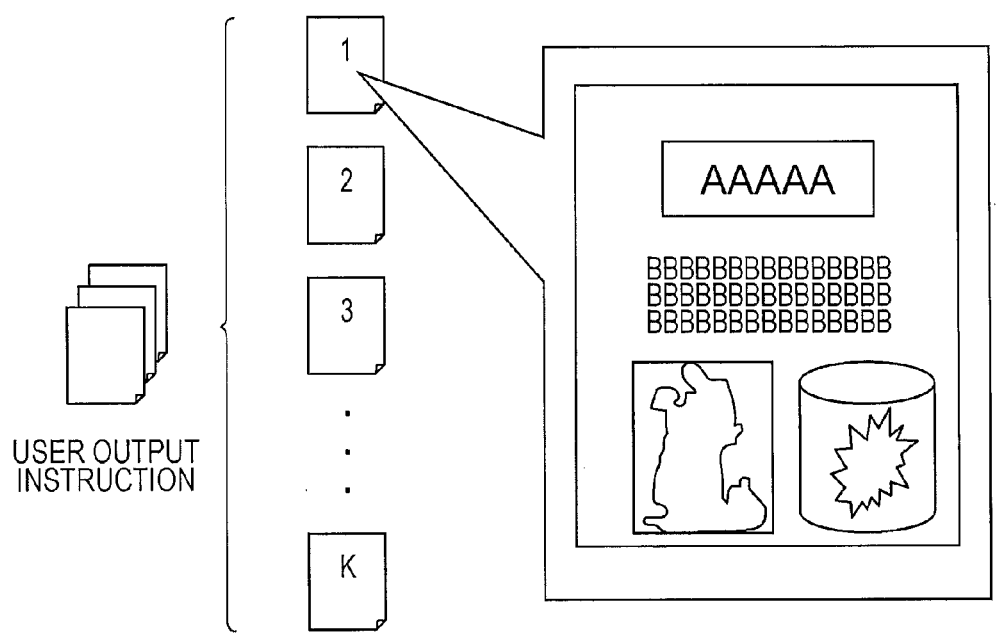
FIG. 4 illustrates an example of image information included in an output instruction.
Figure 5:
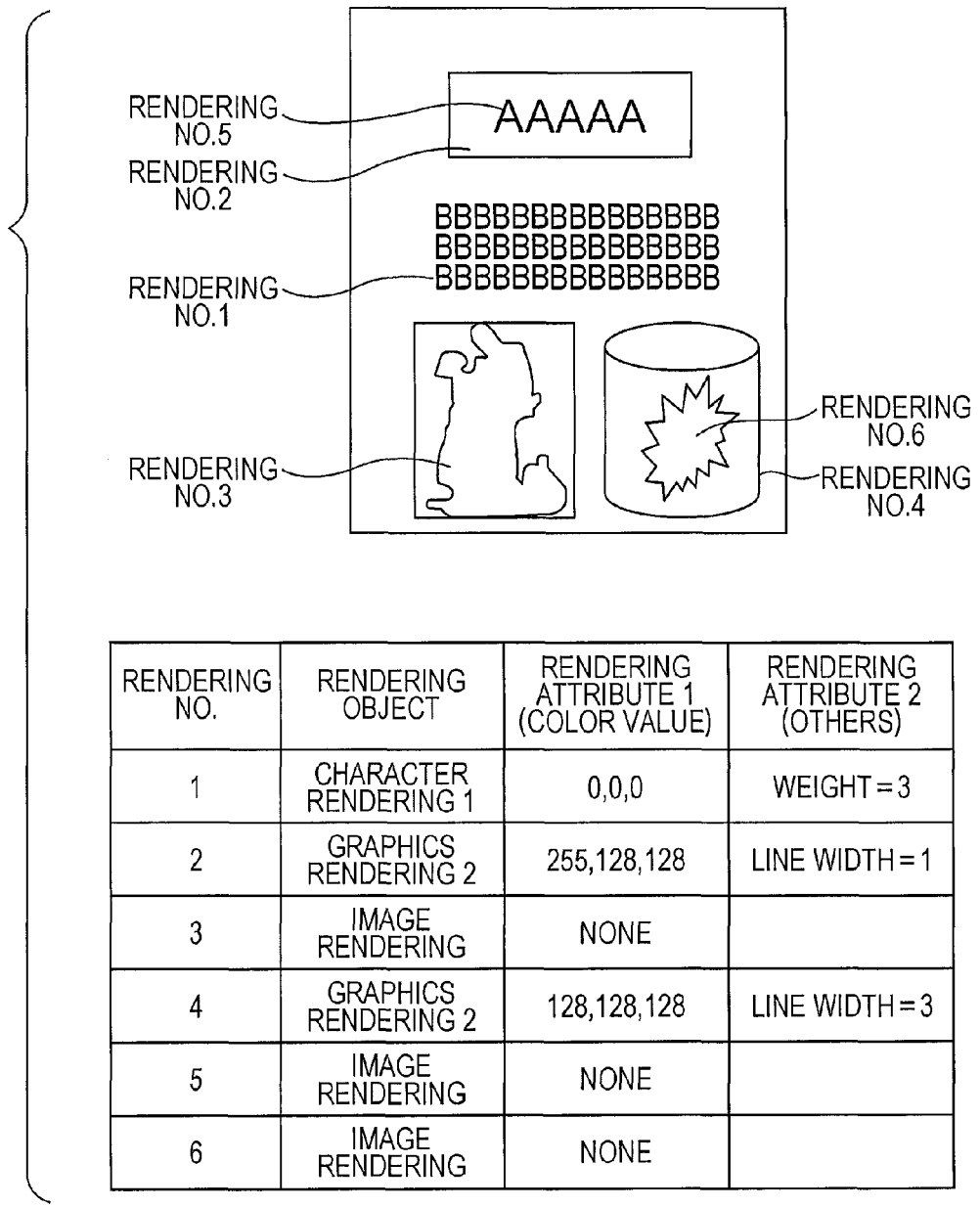
FIG. 5 illustrates an example of how rendering objects are specified.
Figures 6, 7:
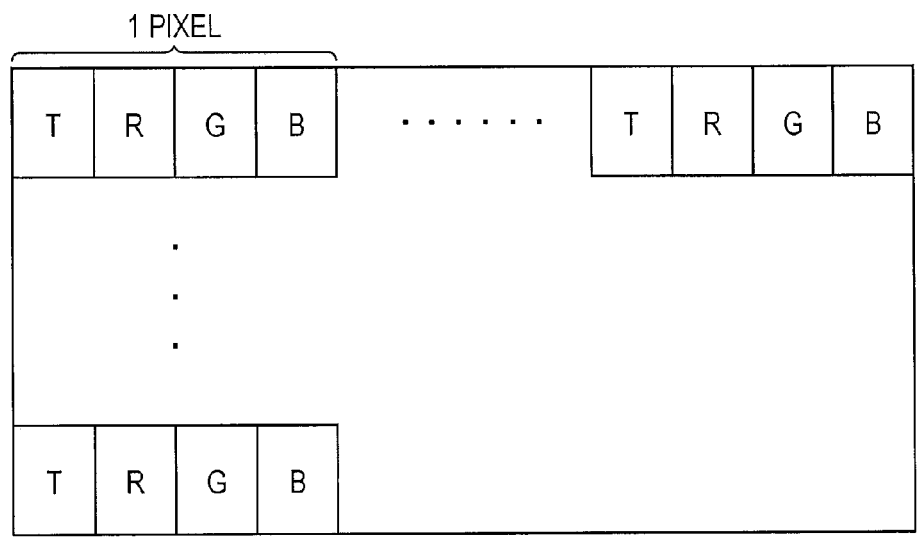
FIG. 6 illustrates an example of rendering objects and information about rendering.
FIG. 7 illustrates an example of raster information.

The job information analyzer 222 accepts each individual piece of image information included in an output instruction as illustrated in FIG. 4, which is acquired from the external apparatus 50 via the communication section 44, by the I/O 20 of the controller 10. Then, for each individual piece of image information included in the output instruction, the job information analyzer 222 determines which page in the output instruction each individual piece of image information corresponds to. Further, for each individual piece of image information, the job information analyzer 222 specifies a rendering object as illustrated in FIG. 5. FIG. 6 illustrates an example of rendering objects and information about rendering.

The rendering processor 224 performs rendering with respect to each individual piece of image information on each page included in the output instruction accepted in the job information analyzer 222, and generates raster information as illustrated in FIG. 7 by converting each individual piece of image information into pixel value information on a pixel-by-pixel basis in accordance with the intended output resolution. In the raster information illustrated in FIG. 7, T denotes Tag information, and R, G, and B denote red, green, and blue pixel value information, respectively. The Tag information is attribute information indicating to which one of character rendering, graphics rendering, and image rendering the pixel in question belongs.

The color value registration list generator 226 generates a color value registration list for each page, on the basis of each individual piece of raster image of each page generated in the rendering processor 224. Specifically, for each individual piece of raster information of each page which is generated in the rendering processor 224, the color value registration list generator 226 sets a predetermined number of consecutive pixels as a unit of detection, and scans a detection window, which represents the unit of detection, from the pixel at the upper left of the raster image to the pixel at the lower right in such a way that no overlapping occurs.

Then, for each detection window thus scanned, in a case where all of the pixels included in the detection window have the same matching pair of color value and attribute (hereinafter, referred to as color value/attribute pair), and each of the color value and the attribute satisfies a predetermined detection condition, if an entry corresponding to the color value (each value of RGB) and the attribute (1: character rendering, 2: graphics rendering, 3: image rendering) does not exist in the color value registration list, the color value registration list generator 226 adds the entry to the color value registration list, and sets the frequency of the entry on the corresponding page (hereinafter, referred to as "on-page frequency") to 1.

FIG. 8 illustrates an example of color value registration list. In the color value registration list, T denotes Tag information, and R, G, and B denote red, green, and blue pixel value information, respectively. For example, red is expressed as RGB=255, 0, 0. The predetermined detection condition for color value is that the color value in question be within a range of color values subject to detection, and the predetermined detection condition for attribute is that the attribute in question be an attribute that is subject to detection.

In a case where an entry corresponding to the color value/attribute pairs that match for all of the pixels included in the detection window already exists in the color value registration list, the color value registration list generator 226 does not add a new entry, and adds 1 to the on-page frequency of the entry corresponding to the color value/attribute pair. Further, in a case where a new entry is to be added to the color value registration list, and the number of entries in the color value registration list has reached an upper limit N, the color value registration list generator 226 adds a new entry after deleting an entry with the smallest value of on-page frequency among the entries stored in the color value registration list. Then, the color value registration list generator 226 sets the value of the on-page frequency of the corresponding entry to 1. In a case where there are multiple entries with the smallest value of on-page frequency, the color value registration list generator 226 deletes the oldest registered entry among the entries with the smallest value of on-page frequency. The color value registration list is an example of first color value registration list.

For each individual color value registration list generated for each page in the color value registration list generator 226, the color value determination list generator 228 generates a color value determination list for the corresponding color value registration list. Specifically, for each color value registration list, with respect to each individual entry stored in the corresponding color value registration list, the color value determination list generator 228 determines, in ascending order of Entry No., whether or not the value of on-page frequency is higher than or equal to a predetermined threshold. The color value determination list generator 228 adds entries with the same color value/attribute pairs as the entries with on-page frequency values higher than or equal to the predetermined threshold to the color value determination list, thereby generating a color value determination list for the corresponding color value registration list. FIG. 9 illustrates an example of color value determination list.

The important color value list generator 230 generates an important color value list on the basis of each color value determination list generated in the color value determination list generator 228. Specifically, for each color value determination list, the important color value list generator 230 adds entries stored in the color value determination list as entries for an important color value list in ascending order of Entry No., and sets the total page count for each of the corresponding entries in the important color value list to 1. In a case where an entry with the same color value/attribute pair as that of an entry to be added already exists in the important color value list, the important color value list generator 230 does not add a new entry, and adds 1 to the total page count for the entry with the same color value/attribute pair. Further, in a case where a new entry is to be added to the important color value list, and the number of entries in the important color value list has reached an upper limit M, the important color value list generator 230 adds a new entry after deleting an entry with the smallest total page count among the entries stored in the important color value list. Then, the important color value list generator 230 sets the value of the total page count for the corresponding entry to 1. In a case where there are multiple entries with the smallest total page count, the important color value list generator 230 deletes the oldest registered entry among the entries with the smallest total page count. The important color value list is an example of second color value registration list.

The color value information memory 232 stores color value registration lists generated in the color value registration list generator 226 for individual pages, color value determination lists generated in the color value determination list generator 228 for individual color value registration lists, and important color value lists generated in the important color value list generator 230.

The color reproduction processor 234 applies, for each page, color conversion to convert image information into image information expressed in colors that can be reproduced in the image forming section 36 (YMCK data or YMCKV data), on the basis of raster information of each individual page generated in the rendering processor 224, and parameters stored in the image processing parameter memory 236 which are used to convert RGB color values into YMCK color values. The color reproduction processor 234 outputs the image information that has undergone the color conversion to the image memory 34 via the controller 10.

The image processing parameter memory 236 stores parameters for converting RGB color values into YMCK color values.

<Color Value Log Acquisition Processing According to First Exemplary Embodiment>

Figure 11:
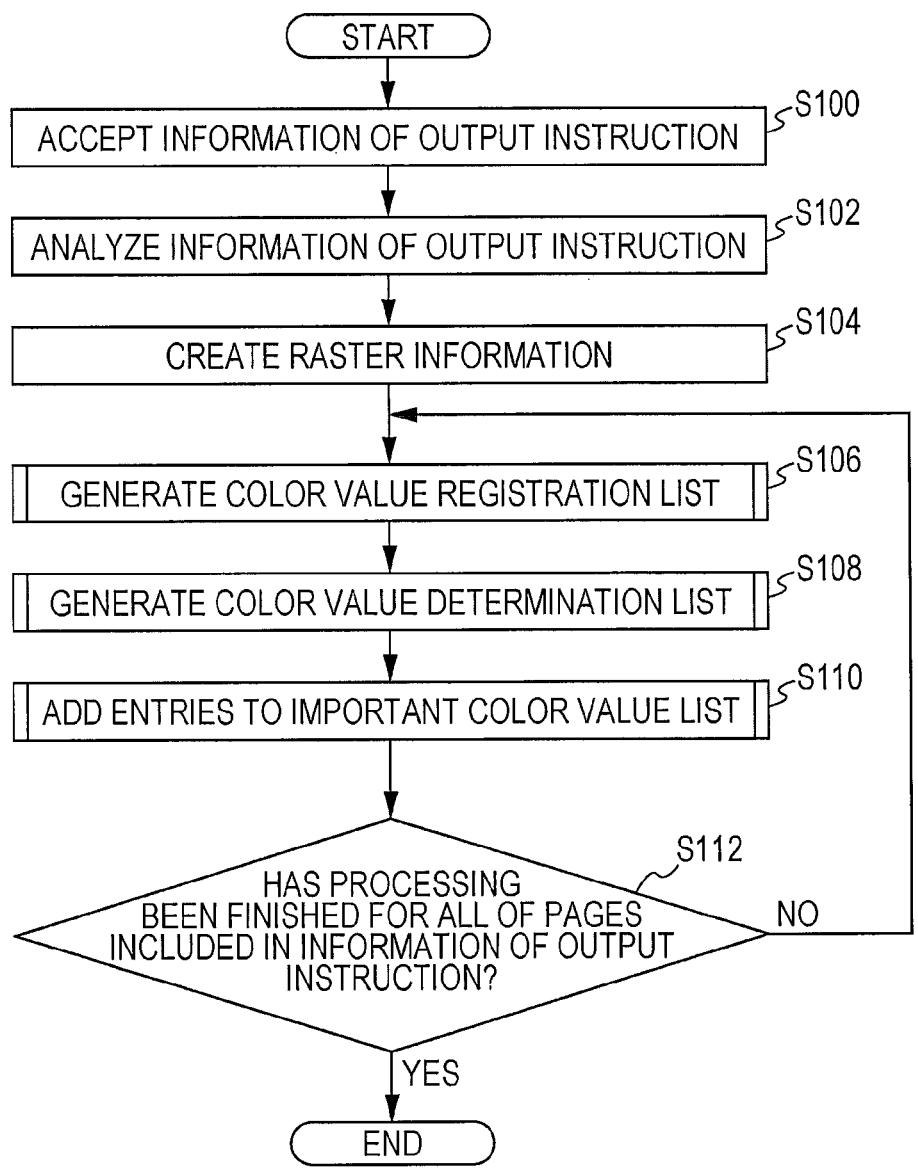
FIG. 11 is a flowchart illustrating a color value log acquisition processing routine in the image processor according to the first exemplary embodiment of the invention.

Next, "color value log acquisition processing" executed by the image processor 32 according to the first exemplary embodiment of the invention will be described. FIG. 11 is a flowchart illustrating an example of the processing routine for "color value log acquisition processing". A control program for "color value log acquisition processing" is read from the memory 42, and executed by the CPU 12. The control program for "color value log acquisition processing" is started in the image processor 32 when an output instruction is acquired via the communication section 44 from the external apparatus 50.

First, in step S100, information of an output instruction acquired via the communication section 44 from the external apparatus 50 is accepted.

Next, in step S102, on the basis of the information of the output instruction acquired in step S100, it is determined which page each individual piece of image information included in the output instruction corresponds to, and a rendering object is specified for each individual piece of image information.

Next, in step S104, rendering is performed for each individual piece of image information of each page included in the output instruction acquired in step S102, and raster information is generated for each individual page. The raster information is obtained by converting image information into pixel value information on a pixel-by-pixel basis in accordance with the intended output resolution.

Next, in step S106, for a page to be processed (hereinafter referred to as "target page"), a color value registration list is generated on the basis of raster information of the target page which is acquired in step S104, and the generated color value registering list is stored into the color value information memory 232.

Next, in step S108, for the target page, a color value determination list is generated on the basis of the color value registration list for the target page acquired in step S106, and the generated color value determination list is stored into the color value information memory 232.

Next, in step S110, for the target page, on the basis of the color value determination list acquired in step S108 which corresponds to the color value registration list for the target page, entries with the same color value/attribute pairs as the color value/attribute pairs of individual entries stored in the color value determination list are added to an important color value list, or the total page count of each of the corresponding entries is updated.

Next, in step S112, it is determined whether or not processing has been finished for all of the pages included in the output instruction acquired in step S100. In a case where processing has been finished for all of the pages, the important color value list acquired in step S110 is stored into the color value information memory 232, and the processing is ended. In a case where processing has not been finished for all of the pages, the target page is changed, and the processing from step S106 to step S112 is repeated.

The control program for "color value log acquisition processing" is repeatedly executed every time an output instruction is acquired from the external apparatus 50 via the communication section 44.

Figure 12:
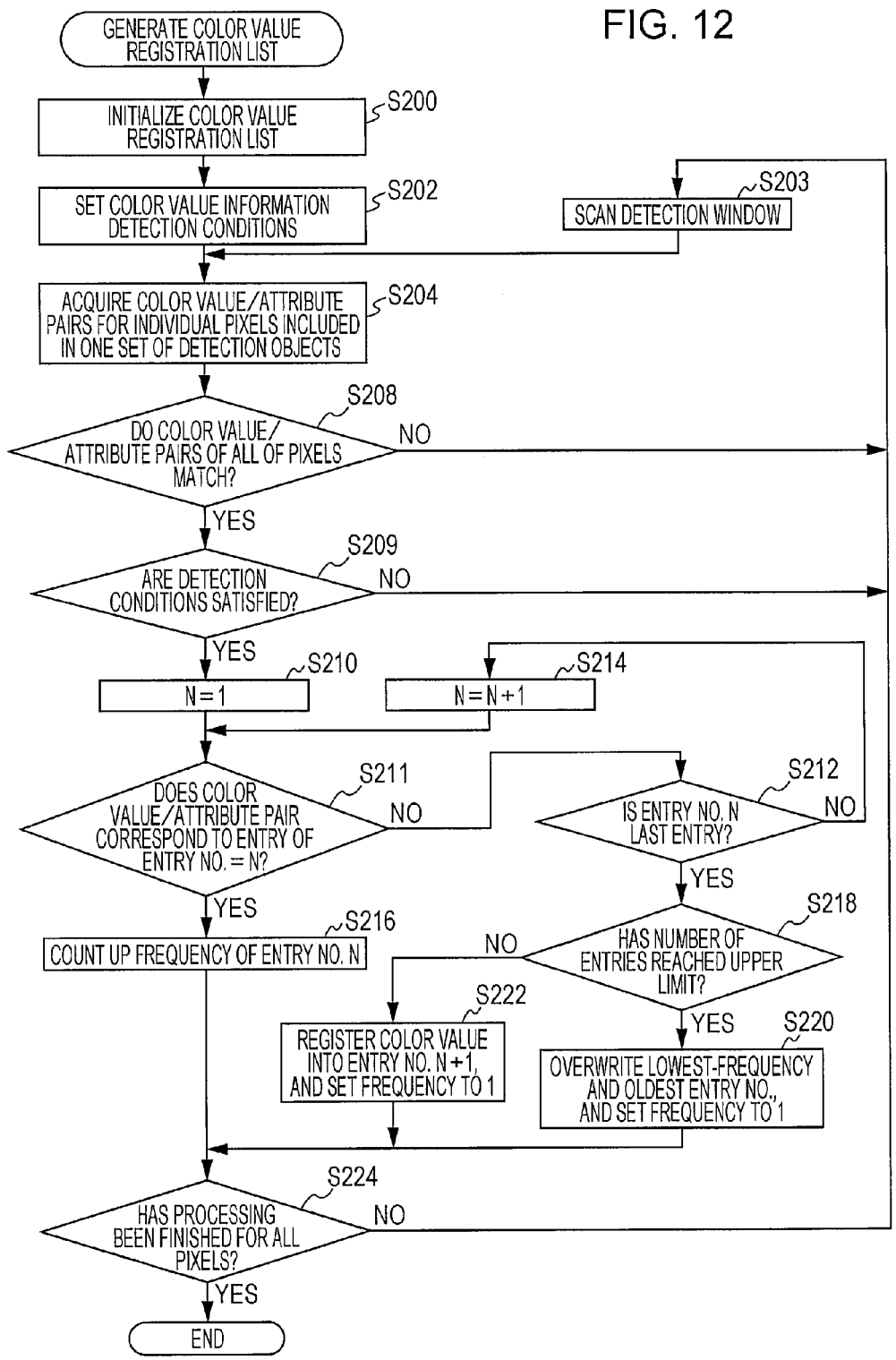
FIG. 12 is a flowchart illustrating a color value registration list generation processing routine in the image processor according to the first exemplary embodiment of the invention.

Step S106 mentioned above is implemented by a color value registration list generation processing routine illustrated in FIG. 12.

First, in step S200, the color value registration list for the target page is accepted, and initialized.

Next, in step S202, a detection window representing a unit of detection is set to the initial position of raster information. In addition, detection conditions are set. The detection conditions indicate a range of color values that are subject to detection, and attributes that are subject to detection.

Next, in step S204, color value/attribute pairs are acquired for individual pixels included in the detection window from the raster information of the target page acquired in step S104.

Next, in step S208, it is determined whether or not the color values of all of the pixels included in the detection window acquired in step S204 match each other. In a case where all of the color value/attribute pairs match each other, the processing transfers to step S209, and in a case where not all of the color value/attribute pairs match each other, the processing transfers to step S203.

In step S203, the detection window is shifted, and the processing returns to step S204.

Next, in step S209, it is determined whether each of individual color value/attribute pairs determined to match in step S208 satisfies the detection conditions set in step S202. In a case where the detection conditions are satisfied, the processing transfers to step S210, and in a case where the detection conditions are not satisfied, the processing transfers to step S203.

Next, in step S210, the value of variable N indicating Entry No. in a color value registration list is set to 1.

In step S211, it is determined whether or not a color value/attribute pair determined to satisfy the detection conditions in step S209 matches the color value/attribute pair of the entry of Entry No. N in the color value registration list. In a case where these color value/attribute pairs match each other, the processing transfers to step S216, and in a case where these color value/attribute pairs do not match each other, the processing transfers to step S212.

In step S212, it is determined for the target page whether or not the entry No. N in the color value registration list is the last entry in the color value registration list. In a case where the entry No. N is the last entry in the color value registration list, the processing transfers to step S218, and in a case where the entry No. N is not the last entry in the color value registration list, the processing transfers to step S214.

In step S214, a value obtained by adding 1 to the value of variable N indicating Entry No. in the color value registration list is set as the value of variable N, and the processing transfers to step S210.

In step S216, 1 is added to the on-page frequency of the entry of Entry No. N in the color value registration list.

In step S218, it is determined whether or not the number of entries in the color value registration list has reached an upper limit. In a case where the number of entries in the color value registration list has reached an upper limit, the processing transfers to step S220, and in a case where the number of entries in the color value registration list has not reached an upper limit, the processing transfers to step S222.

In step S220, among the entries stored in the color value registration list, an entry with the smallest value of on-page frequency is deleted, and then an entry with the same color value/attribute pair as the color value/attribute pair determined to satisfy the detection conditions in step S209 is added to the deleted part of the color value registration list. Then, the value of the on-page frequency of the corresponding entry is set to 1. In a case where there are multiple entries with the smallest value of on-page frequency, among the entries with the smallest value of on-page frequency, the oldest registered entry is deleted.

In step S222, an entry with the same color value/attribute pair as the color value/attribute pair determined to satisfy the detection conditions in step S209 is registered into the entry of Entry No. N+1 in the color value registration list, and the value of the on-page frequency of the corresponding entry is set to 1.

Next, in step S224, it is determined whether or not scanning of the detection window has been finished for the entire raster information of the target page. In a case where scanning of the detection window has been finished for the entire raster information, the color value registration list generation processing routine is ended. In a case where scanning of the detection window has not been finished for the entire raster information, the processing transfers to step S203.

Figure 13:
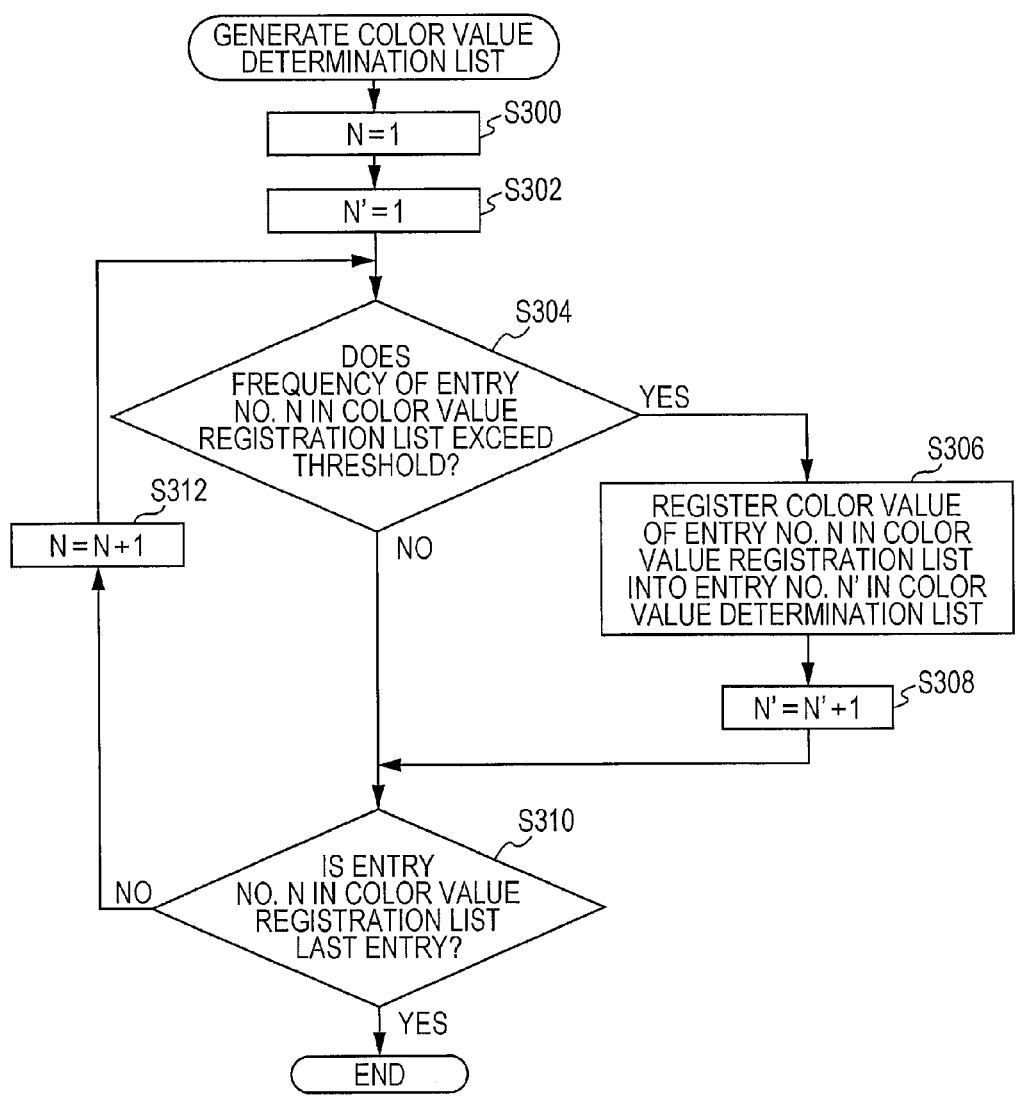
FIG. 13 is a flowchart illustrating a color value determination list generation processing routine in the image processor according to the first exemplary embodiment of the invention.

Step S108 mentioned above is implemented by a color value determination list generation processing routine illustrated in FIG. 13.

First, in step S300, a variable N indicating Entry No. in a color value registration list is set to 1.

Next, in step S302, a variable N' indicating Entry No. in a color value determination list is set to 1.

Next, in step S304, it is determined whether or not the value of the on-page frequency of the entry of Entry No. N in the color value registration list for the target page which is generated in step S106 is higher than or equal to a preset threshold. In a case where the value of the on-page frequency of the entry of Entry No. N in the color value registration list is higher than or equal to the threshold, the processing transfers to step S306, and in a case where the value of the on-page frequency of the entry of Entry No. N is less than the threshold, the processing transfers to step S310.

Next, in step S306, an entry with the same color value/attribute pair as the color value and attribute of the entry of Entry No. N in the color value registration list is registered into the entry of Entry No. N' in the color value determination list.

Next, in step S308, a value obtained by adding 1 to a variable N' indicating Entry No. in a color value determination list is set as the variable N'.

Next, in step S310, it is determined whether or not the entry of Entry No. N in the color value registration list for the target page is the last entry in the color value registration list. In a case where the entry of Entry No. N is the last entry in the color value registration list, the color value determination list generation processing routine is ended, and in a case where the entry of Entry No. N is not the last entry in the color value registration list, the processing transfers to step S312.

In step S312, a value obtained by adding 1 to a variable N indicating Entry No. in a color value determination list is set as the variable N, and the processing transfers to step S304.

Figure 14:
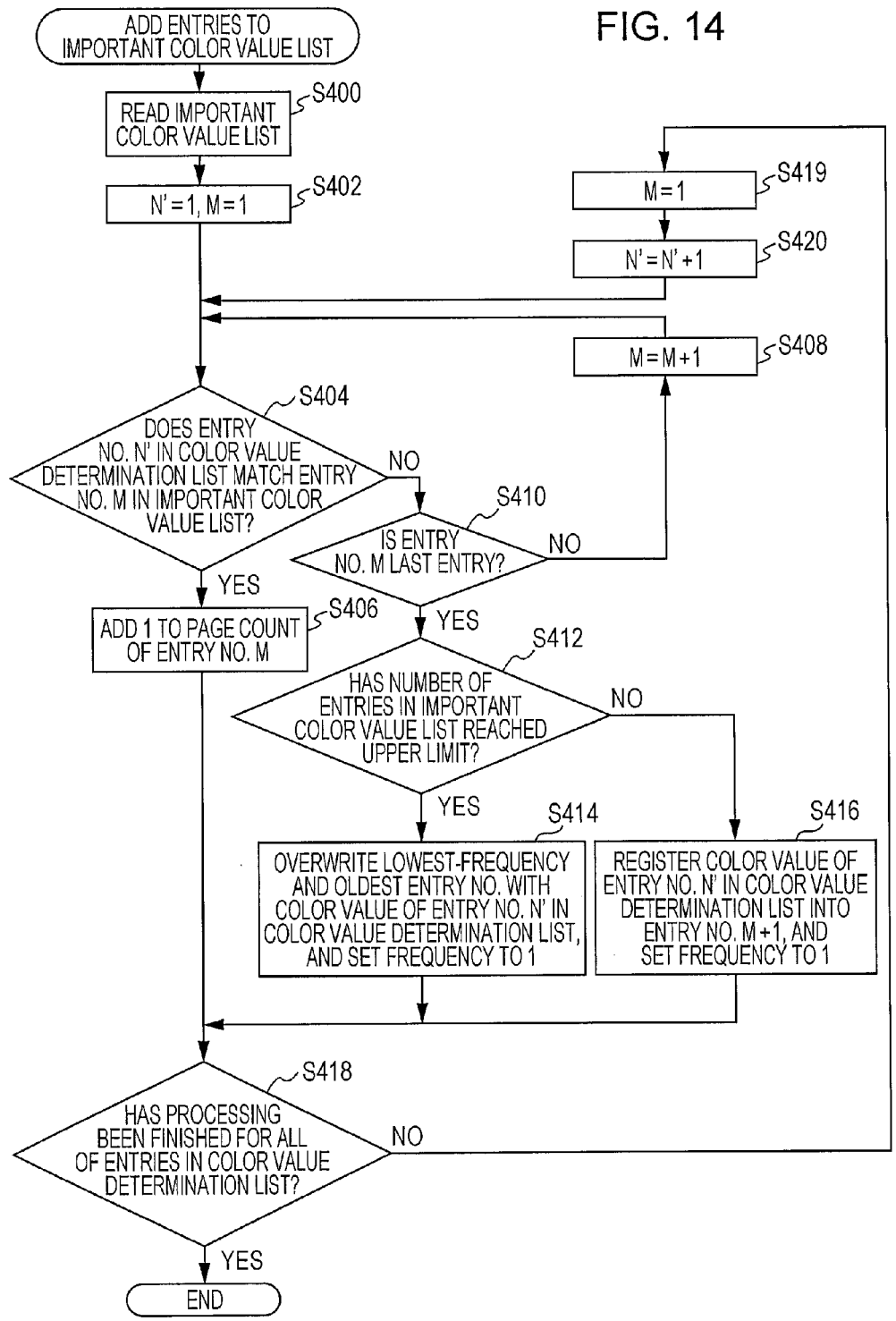
FIG. 14 is a flowchart illustrating an important color value list addition processing routine in the image processor according to the first exemplary embodiment of the invention.

Step S110 mentioned above is implemented by an important color value list addition processing routine illustrated in FIG. 14.

First, in step S400, an important color value list is read.

Next, in step S402, a variable N' indicating Entry No. in a color value determination list, and a variable M indicating Entry No. in an important color value list are each set to 1.

Next, in step S404, it is determined whether or not the color value/attribute pair of the entry of Entry No. N' in the color value determination list for the target page which is acquired in step S108 matches the color value/attribute pair of the entry of Entry No. M in the important color value list acquired in step S400. In a case where the color value/attribute pair of the entry of Entry No. N' in the color value determination list matches the color value/attribute pair of the entry of Entry No. M in the important color value list, the processing transfers to step S406, and in a case where the color value/attribute pair of the entry of Entry No. N' in the color value determination list does not match the color value/attribute pair of the entry of Entry No. M in the important color value list, the processing transfers to step S410.

Next, in step S406, 1 is added to the value of the total page count of the entry of Entry No. M in the important color value list acquired in step S400.

In step S410, it is determined whether or not the entry of Entry No. M in the important color value list acquired in step S400 is the last entry in the important color value list. In a case where the entry of Entry No. M is the last entry in the important color value list, the processing transfers to step S412, and in a case where the entry of Entry No. M is not the last entry in the important color value list, the processing transfers to step S408.

In step S412, it is determined whether or not the number of entries in the important color value list acquired in step S400 has reached an upper limit for the important color value list. In a case where the number of entries in the important color value list has reached an upper limit, the processing transfers to step S414, and in a case where the number of entries in the important color value list has not reached an upper limit, the processing transfers to step S416.

In step S414, among the entries stored in the important color value list acquired in step S400, an entry with the smallest total page count is deleted, and then an entry with the same color value/attribute pair as the entry of Entry No. N' in the color value determination list for the target page which is acquired in step S108 is added to the deleted part of the important color value list. Then, the value of the total page count for the corresponding entry is set to 1. In a case where there are multiple entries with the smallest total page count, among the entries with the smallest total page count, the oldest registered entry is deleted.

In step S416, an entry with the same color value/attribute pair as the entry of Entry No. N' in the color value determination list for the target page which is acquired in step S108 is added to the entry of Entry No. M+1 in the important color value list acquired in step S400, and the value of the total page count for the corresponding entry is set to 1.

In step S408, a value obtained by adding 1 to the value of variable M is set as the variable M.

In step S418, it is determined whether or not processing has been finished for all of the entries in the color value determination list for the target page which is acquired in step S108. In a case where processing has been finished for all of the entries, the important color value list addition processing routine is ended, and in a case where processing has not been finished for all of the entries, the processing transfers to step S419.

In step S419, the value of variable M is set to 1.

In step S420, a value obtained by adding 1 to the value of variable N' indicating Entry No. in the color value determination list is set as the variable N', and the processing transfers to step S404.

As described above, the image processing system according to the first exemplary embodiment generates a color value registration list in which information on the color value of image information is registered while minimizing an increase in the size of the memory area, as compared with the case of generating a color value registration list in which the frequencies of all of the color values of image information are registered.

Next, a second exemplary embodiment will be described. Portions that are configured and operate in the same manner as in the first exemplary embodiment are denoted by the same symbols and a description of those portions is omitted.

The second exemplary embodiment differs from the first exemplary embodiment in that a color value log of image information included in an output instruction is extracted by using a color value extraction list in which entries corresponding to specific color values and attributes are registered.

<Configuration of Image Processing System According to Second Exemplary Embodiment>

Next, an example of an image processing system according to a second exemplary embodiment of the invention will be described with reference to FIG. 15.

Figure 15:
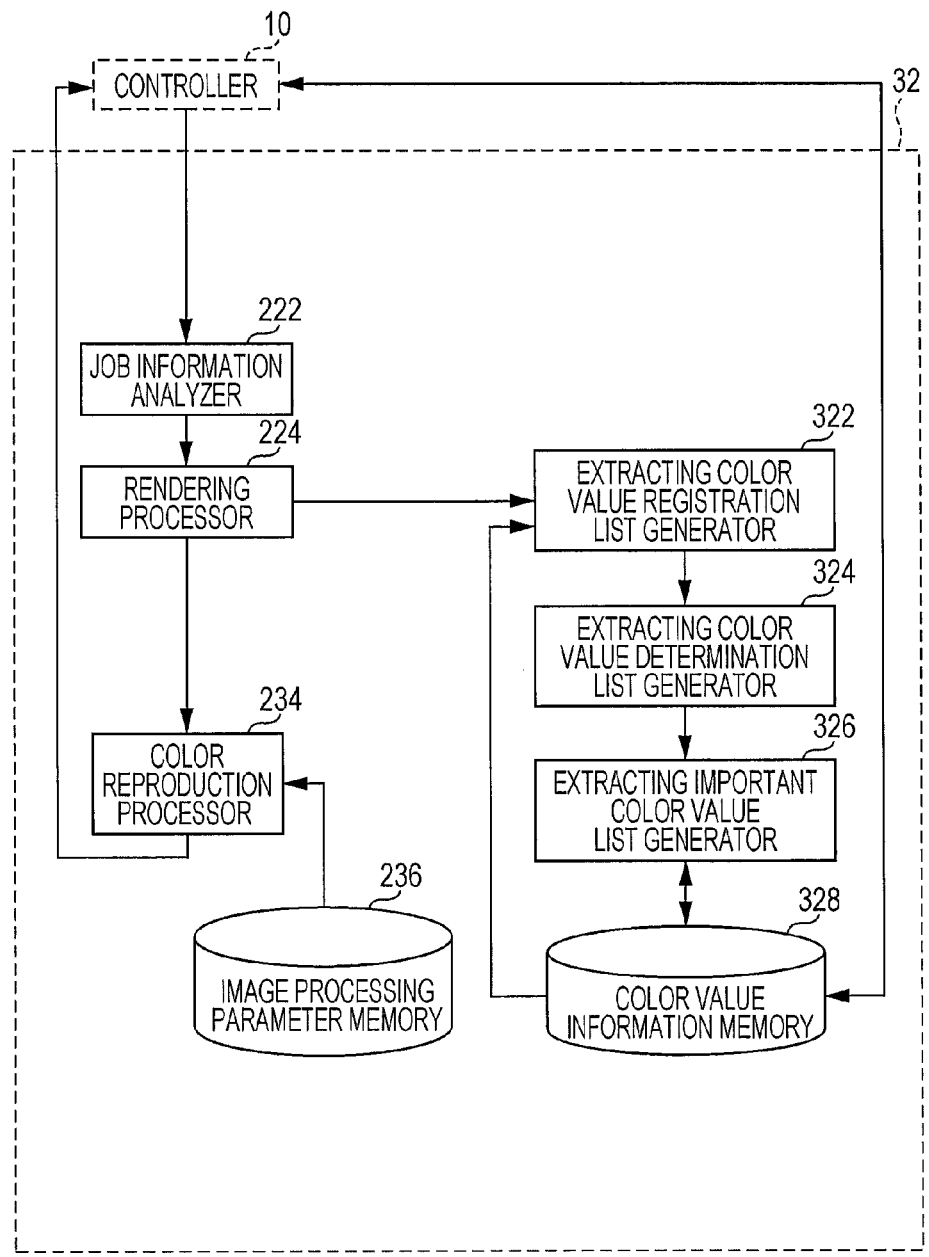
FIG. 15 is a block diagram illustrating a functional configuration of an image processor according to a second exemplary embodiment of the invention.

As illustrated in FIG. 15, the image processor 32 according to the second exemplary embodiment includes the job information analyzer 222, the rendering processor 224, an extracting color value registration list generator 322, an extracting color value determination list generator 324, an extracting important color value list generator 326, a color value information memory 328, the color reproduction processor 234, and the image processing parameter memory 236.

The extracting color value registration list generator 322 counts, for each page, how many color value/attribute pairs indicated by individual entries in a color value extraction list as illustrated in FIG. 16 stored in the color value information memory 328 in advance are included, on the basis of each individual piece of raster information of each page which is generated in the rendering processor 224. Specifically, first, for each page, the extracting color value registration list generator 322 replicates the color value extraction list, and creates an extracting color value registration list by adding the Count Value column to the replicated list. Next, for each individual piece of raster information of each page which is generated in the rendering processor 224, the extracting color value registration list generator 322 scans a detection window from the pixel at the upper left of the raster information to the pixel at the lower right in such a way that no overlapping occurs.

Figure 18:
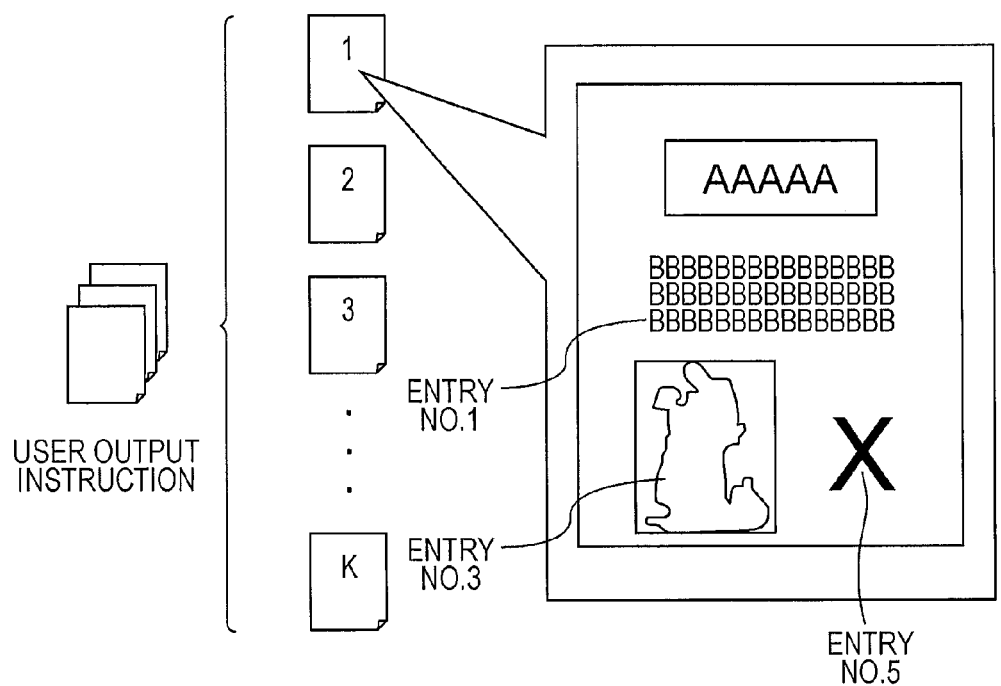
FIG. 18 illustrates an example of image information included in an output instruction.

Then, for each detection window thus scanned, in a case where all of the pixels included in the detection window have the same matching color value/attribute pair, and an entry with the same color value/attribute pair as this color value/attribute pair exists in the extracting color value registration list, the extracting color value registration list generator 322 adds 1 to the count value of an entry in the extracting color value registration list which matches this color value/attribute pair. FIG. 17 illustrates an example of extracting color value registration list. At this time, it is assumed that the output instruction information illustrated in FIG. 18 is inputted to the image processor. The extracting color value registration list is an example of third color value registration list.

The extracting color value determination list color value registration list generated for each page in the extracting color value registration list generator 322, an extracting color value determination list for the corresponding extracting color value registration list. Specifically, for each extracting color value registration list, the extracting color value determination list generator 324 replicates the columns of Entry No., Tag information, and color value information (RGB) for entries corresponding to the color value extraction list stored in the color value information memory 328, and generates a color value determination list by adding a Presence of Color Value column to the replicated list.

Then, for each extracting color value registration list, with respect to each individual entry stored in the extracting color value registration list, the extracting color value determination list generator 324 determines, in ascending order of Entry No., whether or not the count value of the corresponding entry is higher than or equal to a preset threshold. In a case where the count value of the corresponding entry is higher than or equal to the preset threshold, the extracting color value determination list generator 324 registers "Yes" into the Presence of Color Value column for an entry with the same color value/attribute pair as this entry in an extracting color value determination list corresponding to the extracting color value registration list, and in a case where the count value is less than the threshold, the extracting color value determination list generator 324 registers No into the Presence of Color Value column for the entry with the same color value/attribute pair as this entry. An extracting color value determination list corresponding to the above-mentioned extracting color value registration list is generated in this way. FIG. 19 illustrates an example of extracting color value determination list.

The extracting important color value list generator 326 generates an extracting important color value list on the basis of the extracting color value determination list generated in the extracting color value determination list generator 324. Specifically, first, the extracting important color value list generator 326 reads an extracting important color value list stored in the color value information memory 328. In a case where there is no extracting important color value list in the color value information memory 328, the extracting important color value list generator 326 replicates the columns of Entry No., Tag information, and color value information (RGB) for entries corresponding to the color value extraction list stored in the color value information memory 328, and generates an extracting important color value list by adding a Total Page Count column to the replicated list.

Then, on the basis of each extracting color value determination list generated in the extracting color value determination list generator 324, for each extracting color value determination list, with respect to each individual entry whose "Presence of Color Value" column is "Yes" among the entries stored in the corresponding extracting color value determination list, the extracting important color value list generator 326 adds, in ascending order of Entry No., 1 to the total page count of each of entries with the same color value/attribute pair as the entry. FIG. 20 illustrates an example of extracting important color value list. The extracting important color value list is an example of fourth color value registration list.

The color value information memory 328 stores extracting color value registration lists generated in the extracting color value registration list generator 322, extracting color value determination lists generated in the extracting color value determination list generator 324, and extracting important color value lists generated in the extracting important color value list generator 326. The color value information memory 328 also stores color value extraction lists each storing entries corresponding to those color value/attribute pairs which are to be extracted.

<Color Value Log Acquisition Processing According to Second Exemplary Embodiment>

Figure 21:
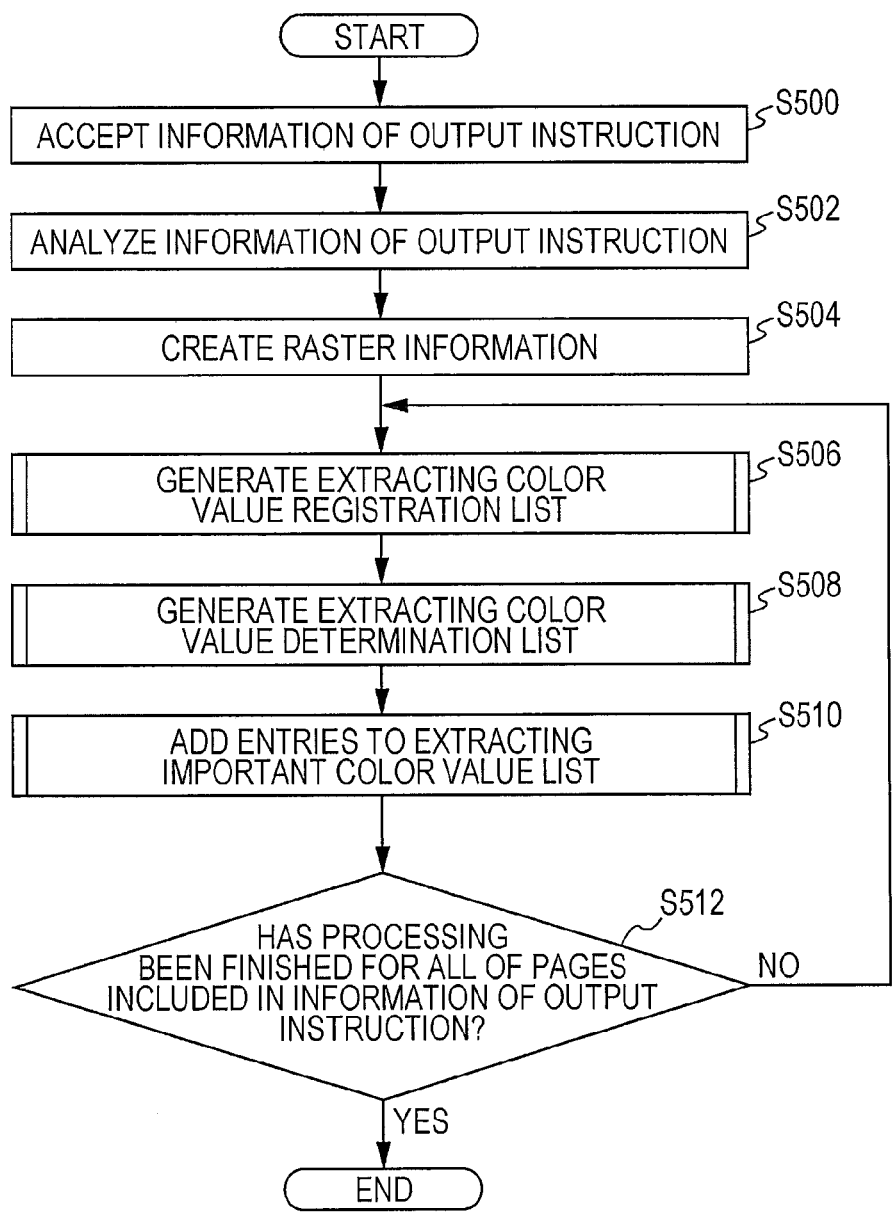
FIG. 21 is a flowchart illustrating a color value log acquisition processing routine in the image processor according to the second exemplary embodiment of the invention.

Next, "color value log acquisition processing" executed by the image processor 32 according to the second exemplary embodiment of the invention will be described. FIG. 21 is a flowchart illustrating an example of the processing routine for "color value log acquisition processing". A control program for "color value log acquisition processing" is read from the memory 42, and executed by the CPU 12. The control program for "color value log acquisition processing" is started in the image processor 32 when an output instruction is acquired via the communication section 44 from the external apparatus 50.

First, in step S500, information of an output instruction acquired via the communication section 44 from the external apparatus 50 is accepted.

Next, in step S502, on the basis of the information of the output instruction acquired in step S500, it is determined which page each individual piece of image information included in the output instruction corresponds to, and a rendering object is specified for each individual piece of image information.

Next, in step S504, rendering is performed for each individual piece of image information of each page acquired in step S502, and raster information is generated for each individual page. The raster information is obtained by converting, for each individual page, image information into pixel value information on a pixel-by-pixel basis in accordance with the intended output resolution.

Next, in step S506, an extracting color value registration list is generated for a target page.

Next, in step S508, for the target page, an extracting color value determination list is generated on the basis of the extracting color value registration list for the target page generated in step S506.

Next, in step S510, for the target page, on the basis of the extracting color value determination list corresponding to the extracting color value registration list for the target page which is acquired in step S508, entries with the same color value/attribute pairs as entries whose "Presence of Color Value" column has the value "Yes" among the entries stored in the extracting color value determination list are added to an extracting important color value list, or the total page count of each of the corresponding entries is updated.

Next, in step S512, it is determined whether or not processing has been finished for all of the pages included in the output instruction acquired in step S500. In a case where processing has been finished for all of the pages, the extracting important color value list acquired in step S510 is stored into the color value information memory 328, and the processing is ended. In a case where processing has not been finished for all of the pages, the target page is changed, and the processing from step S506 to step S512 is repeated.

The control program for "color value log acquisition processing" is repeatedly executed every time an output instruction is acquired from the external apparatus 50 via the communication section 44.

Figure 22:
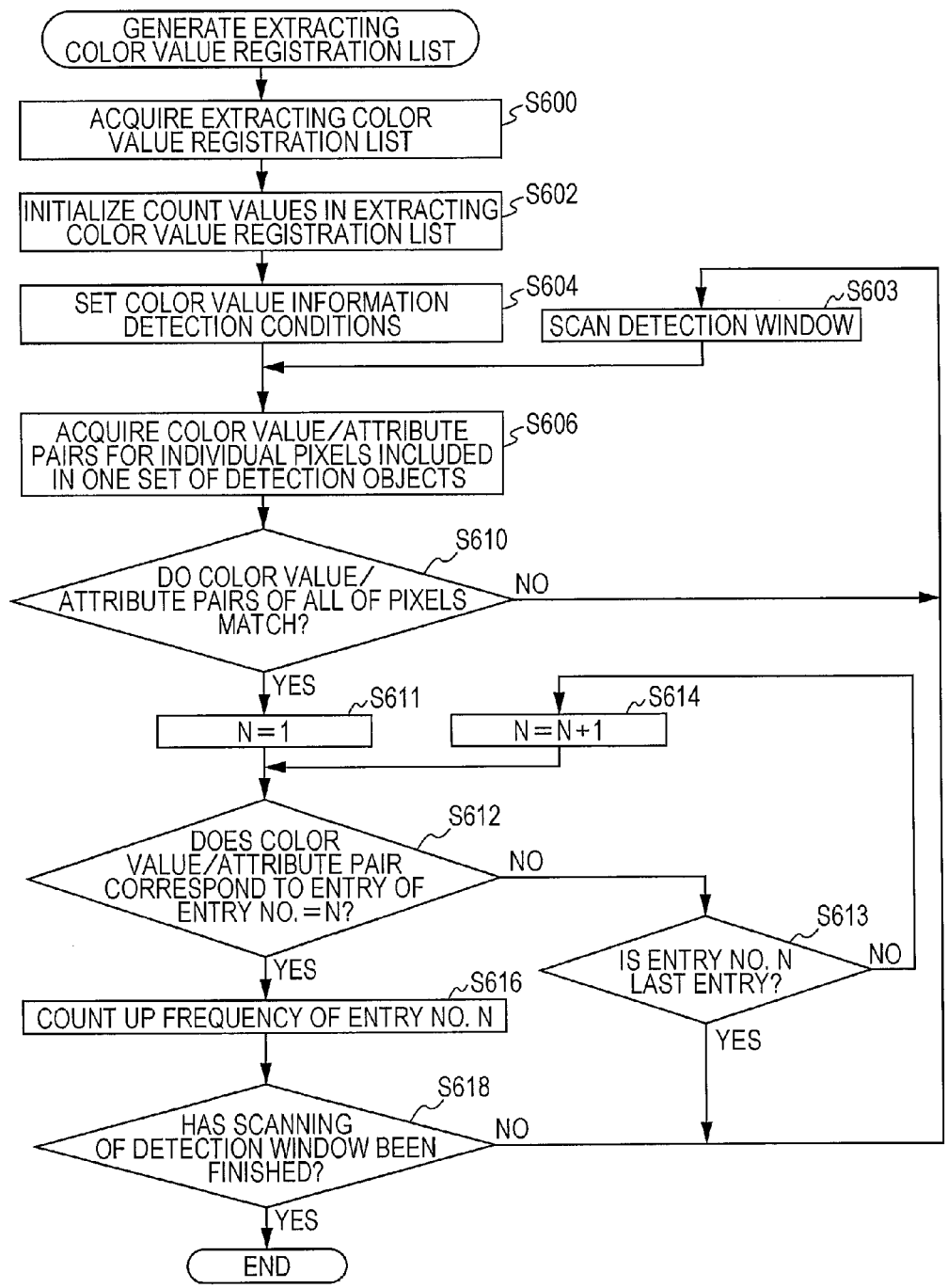
FIG. 22 is a flowchart illustrating an extracting color value registration list generation processing routine in the image processor according to the second exemplary embodiment of the invention.

The step S506 mentioned above is implemented by an extracting color value registration list generation processing routine illustrated in FIG. 22.

First, in step S600, a color value extraction list stored in the color value information memory 328 is replicated, and the Count Value column is added to the replicated list, thereby generating an extracting color value registration list for the target page.

Next, in step S602, the respective count values of entries in the extracting color value registration list generated in step S600 are initialized to 0.

Next, in step S604, a detection window representing a unit of detection is set to the initial position of raster information.

Next, in step S606, color value/attribute pairs are acquired for individual pixels included in the detection window from the raster information of the target page acquired in step S504.

Next, in step S610, it is determined whether or not the color value/attribute pairs of all of the pixels included in the detection window which are acquired in step S606 match each other. In a case where all of the color value/attribute pairs match each other, the processing transfers to step S611, and in a case where not all of the color value/attribute pairs match each other, the processing transfers to step S603.

In step S603, the detection window is shifted, and the processing returns to step S606.

Next, in step S611, the value of variable N indicating Entry No. in an extracting color value registration list is set to 1.

In step S612, it is determined whether or not the color value/attribute pairs determined to be the same matching pair in step S610, and the color value/attribute pair for the entry of Entry No. N in the extracting color value registration list generated in step S600 match each other. In a case where a match occurs with the color value/attribute pair of the entry of Entry No. N, the processing transfers to step S616, and in a case where a match does not occur with the color value/attribute pair of the entry of Entry No. N, the processing transfers to step S613.

Next, in step S613, it is determined whether or not the entry of Entry No. N is the last entry in the extracting color value registration list. In a case where the entry of Entry No. N is the last entry in the extracting color value registration list, the processing transfers to step S603, and in a case where the entry of Entry No. N is not the last entry in the extracting color value registration list, the processing transfers to step S614.

Next, in step S614, a value obtained by adding 1 to the value of variable N indicating Entry No. in an extracting color value registration list is set as the value of variable N, and the processing transfers to step S612.

Next, in step S616, 1 is added to the count value of the entry of Entry No. N in the extracting color value registration list acquired in step S600.

Next, in step S618, it is determined whether or not scanning of the detection window has been finished for the entire raster information of all of pixels on the target page. In a case where scanning of the detection window has been finished for the entire raster information, the extracting color value registration list generation processing routine is ended. In a case where scanning of the detection window has not been finished for the entire raster information, the processing transfers to step S603.

Figure 23:
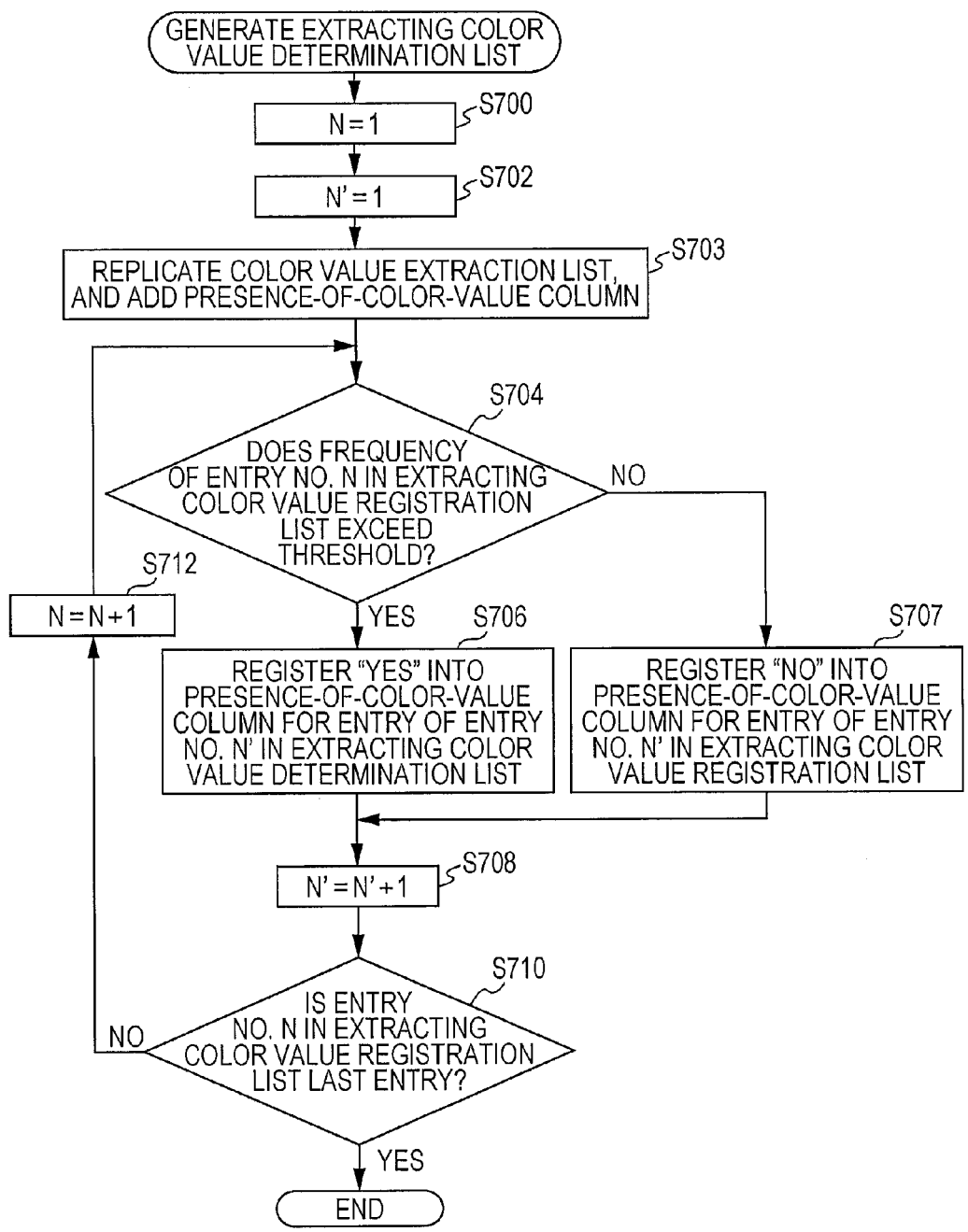
FIG. 23 is a flowchart illustrating an extracting color value determination list generation processing routine in the image processor according to the second exemplary embodiment of the invention.

Step S506 mentioned above is implemented by an extracting color value determination list generation processing routine illustrated in FIG. 23.

First, in step S700, a variable N indicating Entry No. in an extracting color value registration list is set to 1.

Next, in step S702, a variable N' indicating Entry No. in an extracting color value determination list is set to 1.

Next, in step S703, a color value extraction list stored in the color value information memory 328 is replicated, and the "Presence of Color Value" column is added to the replicated list, thereby generating an extracting color value determination list corresponding to the extracting color value registration list of the target page.

Next, in step S704, it is determined whether or not the value of the on-page frequency of the entry of Entry No. N in the extracting color value registration list for the target page which is generated in step S506 is higher than or equal to a preset threshold. In a case where the value of the on-page frequency of the entry of Entry No. N in the extracting color value registration list is higher than or equal to the threshold, the processing transfers to step S706, and in a case where the value of the on-page frequency of the entry of Entry No. N is less than the threshold, the processing transfers to step S707.

Next, in step S706, "Yes" is registered into the "Presence of Color Value" column for the entry of Entry No. N' in the extracting color value determination list.

In step S707, "No" is registered into the "Presence of Color Value" column for the entry of Entry No. N' in the extracting color value determination list.

Next, in step S708, a value obtained by adding 1 to a variable N' indicating Entry No. in an extracting color value determination list is set as the variable N'.

Next, in step S710, it is determined whether or not the entry of Entry No. N in the extracting color value registration list for the target page is the last entry in the extracting color value registration list. In a case where the entry of Entry No. N is the last entry in the extracting color value registration list, the extracting color value determination list generation processing routine is ended, and in a case where the entry of Entry No. N is not the last entry in the extracting color value registration list, the processing transfers to step S712.

In step S712, a value obtained by adding 1 to a variable N indicating Entry No. in an extracting color value determination list is set as the variable N, and the processing transfers to step S704.

Figure 24:
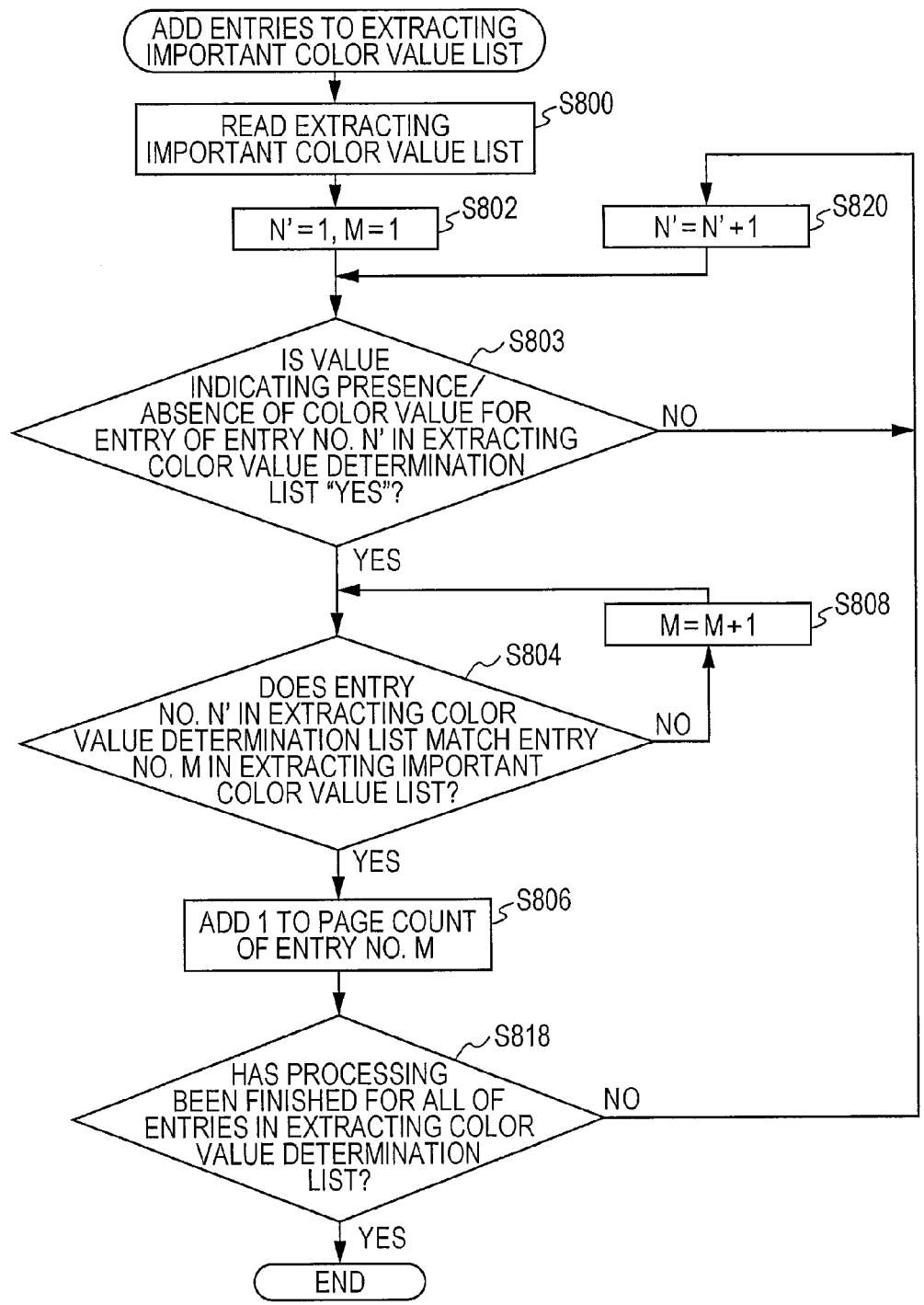
FIG. 24 is a flowchart illustrating an extracting important color value list generation processing routine in the image processor according to the second exemplary embodiment of the invention.

Step S508 mentioned above is implemented by an extracting important color value list addition processing routine illustrated in FIG. 24.

First, in step S800, an extracting important color value list is read.

Next, in step S802, a variable N' indicating Entry No. in an extracting color value determination list, and a variable M indicating Entry No. in an extracting important color value list are each set to 1.

Next, in step S803, it is determined whether or not the value "Yes" is registered in the "Presence of Color Value" column for the entry of Entry No. N' in the extracting color value determination list for the target page which is acquired in step S506. In a case where the value "Yes" is registered, the processing transfers to step S804, and in a case where the value "Yes" is not registered, the processing transfers to step S820.

Next, in step S804, it is determined whether or not the color value/attribute pair of the entry of Entry No. N' in the extracting color value determination list for the target page which is acquired in step S506 matches the color value/attribute pair of the entry of Entry No. M in the extracting important color value list acquired in step S800. In a case where these color value/attribute pairs match each other, the processing transfers to step S806, and in a case where these color value/attribute pairs do not match each other, the processing transfers to step S808.

Next, in step S806, 1 is added to the value of the total page count of the entry of Entry No. M in the extracting important color value list acquired in step S800.

In step S808, a value obtained by adding 1 to the value of variable M indicating Entry No. in an extracting important color value list is set as the variable M.

In step S818, it is determined whether or not processing has been finished for all of the entries in the extracting color value determination list corresponding to the extracting color value registration list for the target page which is acquired in step S508. In a case where processing has been finished for all of the entries, the extracting important color value list addition processing routine is ended, and in a case where processing has not been finished for all of the entries, the processing transfers to step S820.

In step S820, a value obtained by adding 1 to the value of variable N' indicating Entry No. in an extracting color value determination list is set as the variable N', and the processing transfers to step S803.

As described above, the image processing system according to the second exemplary embodiment extracts the frequencies of specific colors on pages included in an output instruction, while minimizing an increase in the size of the memory area.

Next, a third exemplary embodiment will be described. Portions that are configured and operate in the same manner as in the first and second exemplary embodiments are denoted by the same symbols and a description of these portions is omitted.

The third exemplary embodiment differs from the first and second exemplary embodiments in that an important color value list generated on the basis of image information included in an output instruction issued within a predetermined period is used as a color value extraction list to extract a color value log of image information included in another output instruction issued after elapse of the predetermined period.

<Configuration of Image Processing System According to Third Exemplary Embodiment>

Next, an example of an image processing system according to a third exemplary embodiment of the invention will be described with reference to FIG. 25. Portions that are configured and operate in the same manner as in the first and second exemplary embodiments are denoted by the same symbols and a description of those portions is omitted.

Figure 25:
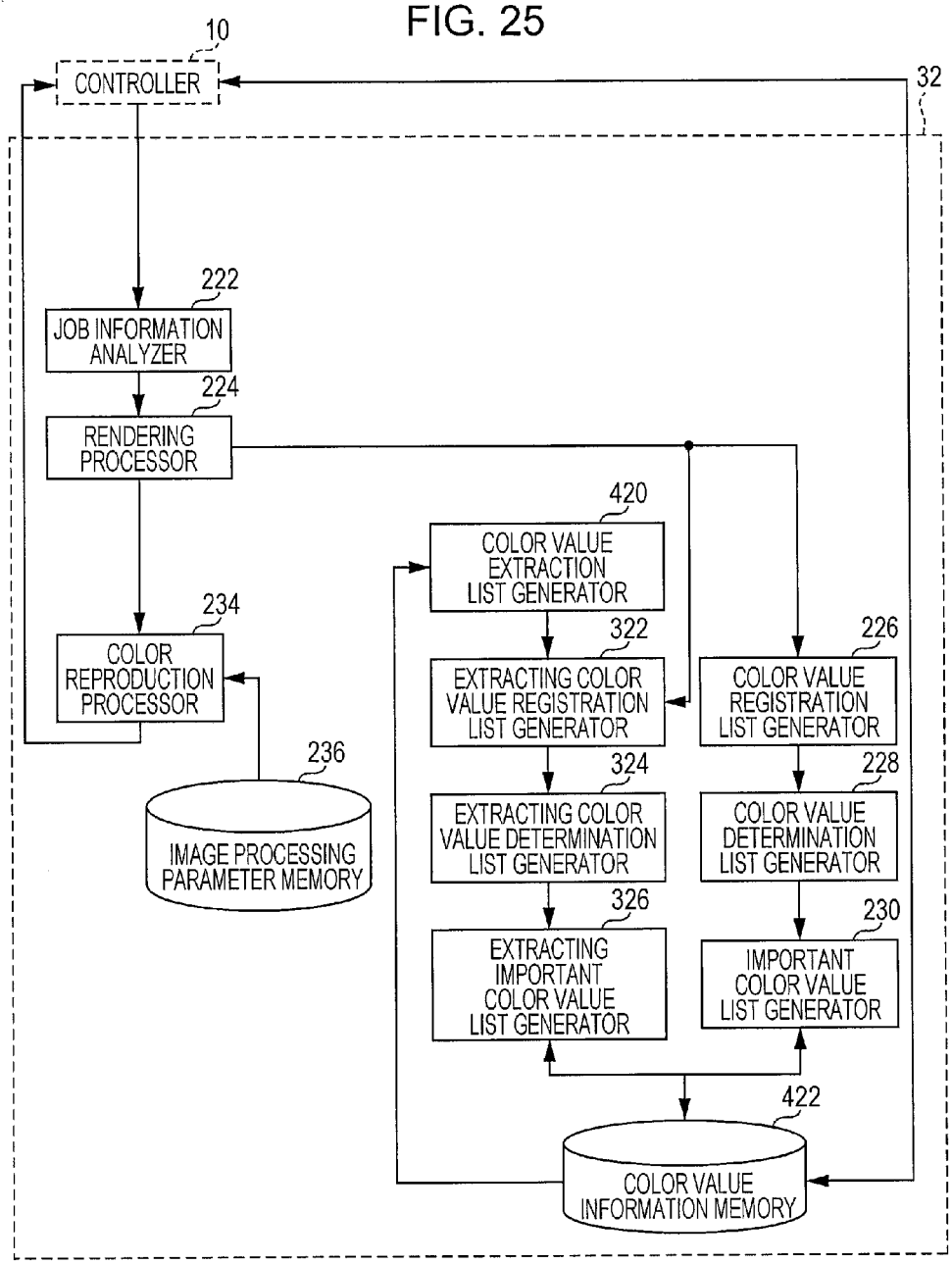
FIG. 25 is a block diagram illustrating a functional configuration of an image processor according to a third exemplary embodiment of the invention.

As illustrated in FIG. 25, the image processor 32 according to the third exemplary embodiment includes the job information analyzer 222, the rendering processor 224, the color value registration list generator 226, the color value determination list generator 228, the important color value list generator 230, the extracting color value registration list generator 322, the extracting color value determination list generator 324, the extracting important color value list generator 326, a color value information memory 422, the color reproduction processor 234, and the image processing parameter memory 236.

The color value registration list generator 226, the color value determination list generator 228, and the important color value list generator 230 perform various processing for each individual output instruction issued within a predetermined period for generating an important color value list, on the basis of each individual piece of raster information of image information which is generated in the rendering processor 224 for each pixel on each page. As a result, an important color value list is generated, and stored into the color value information memory 422.

A color value extraction list generator 420 generates a color value extraction list by using an important color value list stored in the color value information memory 422. Specifically, the color value extraction list generator 420 generates a color value extraction list including individual entries with the same color value/attribute pairs as the color value/ attribute pairs of individual entries registered in the important color value list stored in the color value information memory 422. The color value extraction list stores only information on color value and attribute, and the column corresponding to the total page count in an important color value list is not generated.

For an output instruction generated after elapse of a predetermined period for generating an important color value list, the extracting color value registration list generator 322 counts, for each page, how many color value/attribute pairs of individual entries in the color value extraction list generated in the color value extraction list generator 420 are included, on the basis of each individual piece of raster information of each page which is generated in the rendering processor 224. Specifically, first, for each page, the extracting color value registration list generator 322 replicates the color value extraction list, and creates an extracting color value registration list by adding the Count Value column to the replicated list. Next, for each individual piece of raster information of each page which is generated in the rendering processor 224, the extracting color value registration list generator 322 scans a detection window from the pixel at the upper left of the raster information to the pixel at the lower right in such a way that no overlapping occurs.

Then, for each detection window thus scanned, in a case where all of the pixels included in the detection window have the same matching color value/attribute pair, and an entry with the corresponding color value/attribute pair exists in the extracting color value registration list, the extracting color value registration list generator 322 adds 1 to the count value of an entry with the same color value/attribute pair as this color value/attribute pair. At this time, individual pieces of raster information of image information on each page included in a rendered output instruction inputted to the extracting color value registration list generator 322 differ from individual pieces of raster information inputted to the color value registration list generator 226. The extracting color value registration list is an example of third color value registration list. With respect to an output instruction generated after elapse of a predetermined period for generating an important color value list, the individual pieces of raster information of each page generated in the rendering processor 224 are not inputted to the color value registration list generator 226 but are all inputted to the extracting color value registration list generator 322.

The extracting important color value list generator 326 generates an extracting important color value list on the basis of the extracting color value determination list generated in the extracting color value determination list generator 324. Specifically, first, the extracting important color value list generator 326 reads an extracting important color value list stored in the color value information memory 422. In a case where there is no extracting important color value list in the color value information memory 422, the extracting important color value list generator 326 replicates the columns of Entry No., Tag information, and color value information (RGB) for entries corresponding to an important color value list stored in the color value information memory 422 which is generated from the information of an output instruction issued within a predetermined period, and generates an extracting important color value list by adding the Total Page Count column to the replicated list.

Then, on the basis of each extracting color value determination list generated in the extracting color value determination list generator 324, for each corresponding extracting color value determination list, with respect to each individual entry whose "Presence of Color Value" column is "Yes" among the entries stored in the corresponding extracting color value registration list, the extracting important color value list generator 326 adds, in ascending order of Entry No., 1 to the total page count of an entry with the same color value/attribute pair as this entry. FIG. 20 illustrates an example of extracting important color value list. The extracting important color value list is an example of fourth color value registration list.

<Color Value Log Acquisition Processing According to Third Exemplary Embodiment>

Next, "color value log acquisition processing" executed by the image processor 32 according to the third exemplary embodiment of the invention will be described.

The control program for "color value log acquisition processing" is executed in the image processor 32 every time an output instruction is acquired from the external apparatus 50 via the communication section 44. In the third exemplary embodiment, for each individual output instruction issued within a predetermined period for generating an important color value list, the color value log acquisition processing routine illustrated in FIG. 11 is executed as in the first exemplary embodiment.

Then, after elapse of the predetermined period for generating an important color value list, the color value extraction list generator 420 generates a color value extraction list on the basis of an important color value list stored in the color value information memory 422. Next, every time an output instruction is acquired from the external apparatus 50 via the communication section 44, the color value acquisition processing routine illustrated in FIG. 21 is executed in the image processor 32 as in the second exemplary embodiment.

As described above, the image processing system according to the third exemplary embodiment extracts the frequencies of specific colors on pages included in an output instruction, while minimizing an increase in the size of the memory area.

Next, a fourth exemplary embodiment will be described. Portions that are configured and operate in the same manner as in the first and second exemplary embodiments are denoted by the same symbols and a description of these portions is omitted.

The fourth exemplary embodiment differs from the first exemplary embodiment in that a color value log is extracted by a relay unit.

<Configuration of Image Processing System According to Fourth Exemplary Embodiment>

Figure 26:
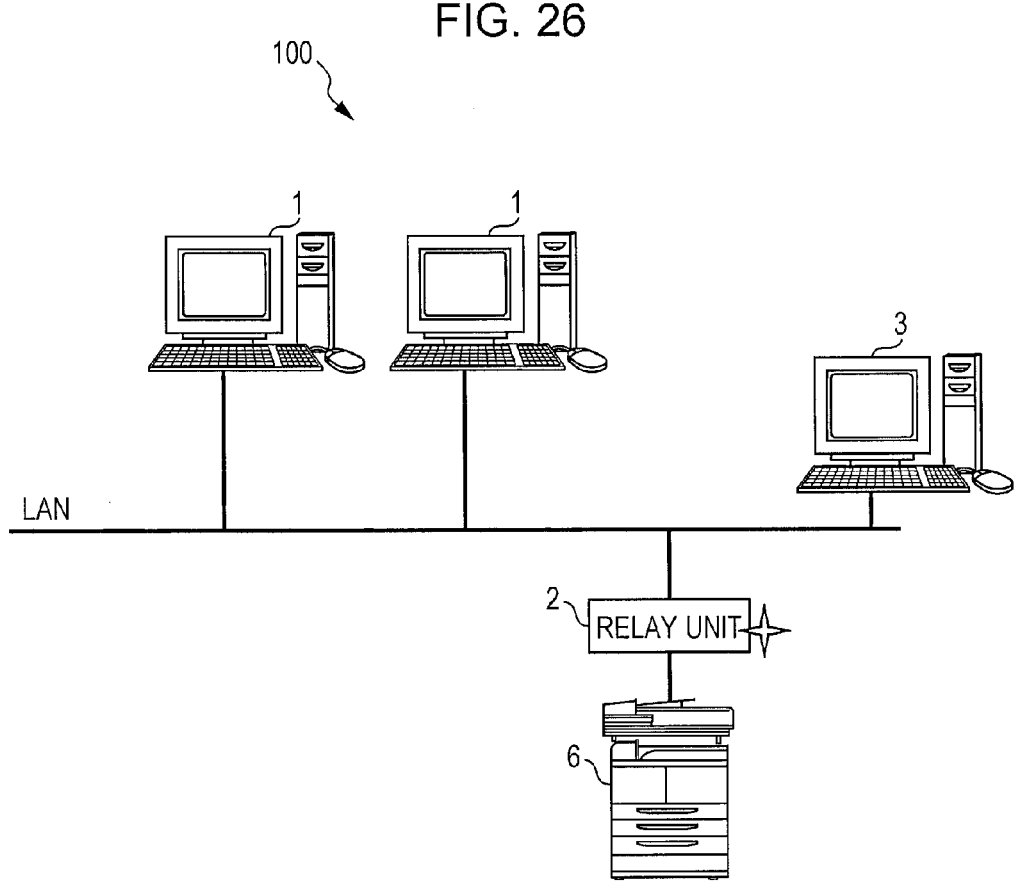
FIG. 26 illustrates a configuration of an image processing system according to a fourth exemplary embodiment of the invention.

First, an image processing system according to the fourth exemplary embodiment of the invention will be described. FIG. 26 illustrates an example of the overall configuration of the image processing system according to the fourth exemplary embodiment of the invention. As illustrated in FIG. 26, an image processing system 100 according to the fourth exemplary embodiment includes the terminal apparatus 1, a relay unit 2, the log analyzing terminal apparatus 3, and an image forming apparatus 6, which are connected to each other via a communication section.

The relay unit 2 performs image processing for image information which is instructed to be outputted from the terminal apparatus 1 to the image forming apparatus 6, and retains, as a log, information on the color value of image information included in the output instruction.

The image forming apparatus 6 outputs image information included in the output instruction from the terminal apparatus 1 via the relay unit 2.

<Configuration of Relay Unit According to Fourth Exemplary Embodiment>

Figure 27:
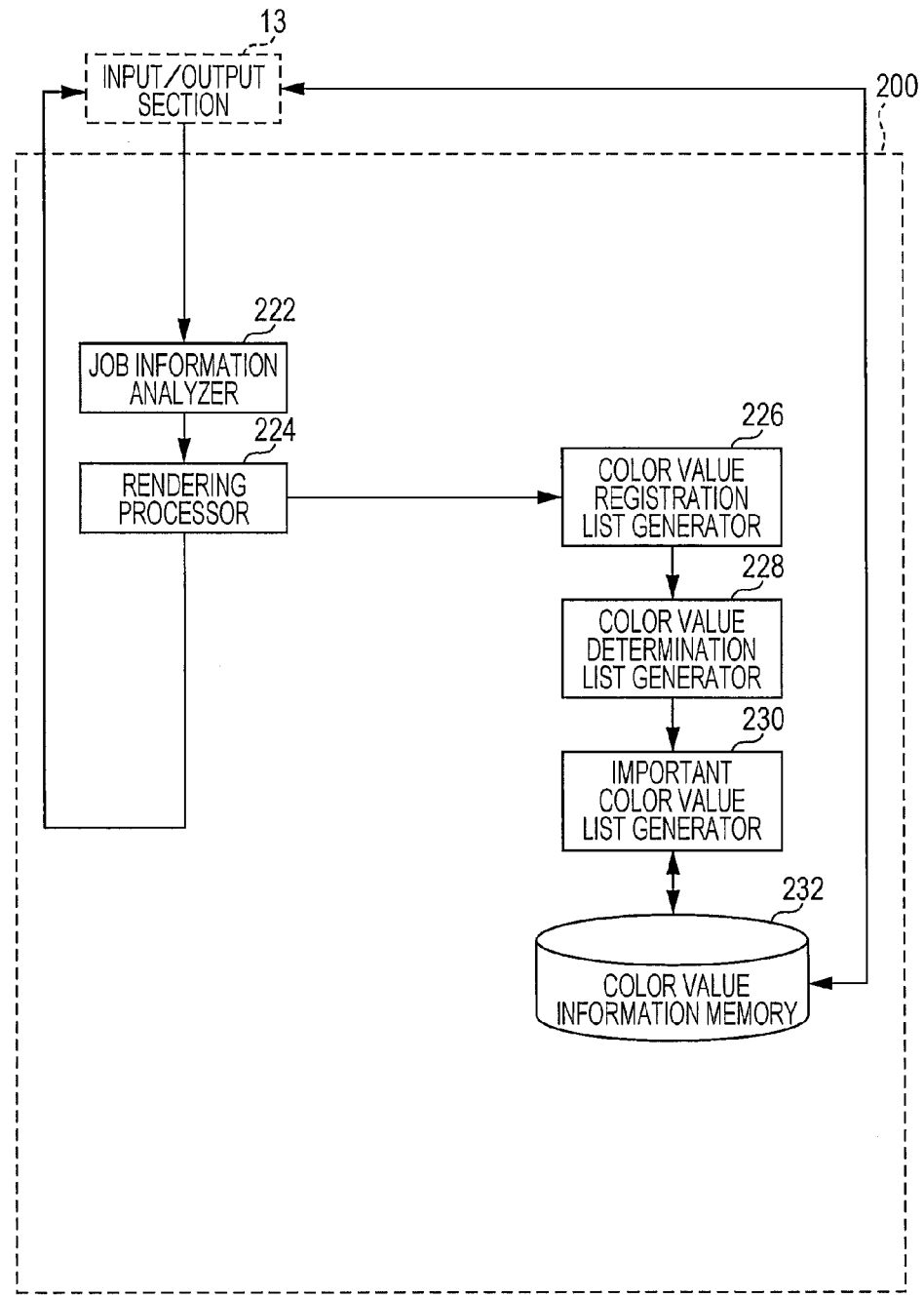
FIG. 27 is a block diagram illustrating a functional configuration of a relay unit according to the fourth exemplary embodiment of the invention.

Next, the relay unit according to the fourth exemplary embodiment of the invention will be described. FIG. 27 illustrates an example of the configuration of the relay unit 2 according to the fourth exemplary embodiment of the invention. As illustrated in FIG. 27, the relay unit 2 according to the fourth exemplary embodiment includes an input/output section 13, and an image processor 200.

The input/output section 13 accepts an input of an output instruction transmitted form the terminal apparatus 1 to the image forming apparatus 6, and outputs the results of image processing by the image processor 200 to the image forming apparatus 6. The input/output section 13 also accepts a request for a color value log from the log analyzing terminal apparatus, and transmits a color value log stored in a color value information memory to the log analyzing terminal apparatus.

The image processor 200 includes the job information analyzer 222, the rendering processor 224, the color value registration list generator 226, the color value determination list generator 228, the important color value list generator 230, and the color value information memory 232.

<Configuration of Image Forming Apparatus According to Fourth Exemplary Embodiment>

Next, an image forming apparatus according to the fourth exemplary embodiment of the invention will be described.

The image processor 32 of the image forming apparatus 6 includes the color reproduction processor 234 and the image processing parameter memory 236.

<Color Value Log Acquisition Processing According to Fourth Exemplary Embodiment>

Next, "color value log acquisition processing" executed by the relay unit 2 according to the fourth exemplary embodiment of the invention will be described.

The control program for "color value log acquisition processing" is started in the relay unit 2 when an input of an output instruction transmitted from the terminal apparatus 1 to the image forming apparatus 6 is acquired. In the relay unit 2 according to the fourth exemplary embodiment, the color value log acquisition processing routine illustrated in FIG. 11 is executed in the same manner as in the image processor 32 according to the first exemplary embodiment.

The control program for "color value log acquisition processing" is repeatedly executed every time an output instruction is acquired via the input/output section 13.

As described above, in the image processing system according to the fourth embodiment, by installing a relay unit on a network, important colors on pages included in an output instruction are extracted without using a large memory area.

The relay unit 2 of the image processing system according to the fourth exemplary embodiment may be provided with the function of the image processor 32 of the image forming apparatus 5 configured as in each of the second and third embodiments mentioned above.

Next, a fifth exemplary embodiment will be described. Portions that are configured and operate in the same manner as in the first and second exemplary embodiments are denoted by the same symbols and a description of these portions is omitted.

The fifth exemplary embodiment differs from the first exemplary embodiment in that the color values of image information which represent gradation are excluded from a color value log.

<Configuration of Image Processing System According to Fifth Exemplary Embodiment>

Figure 28:
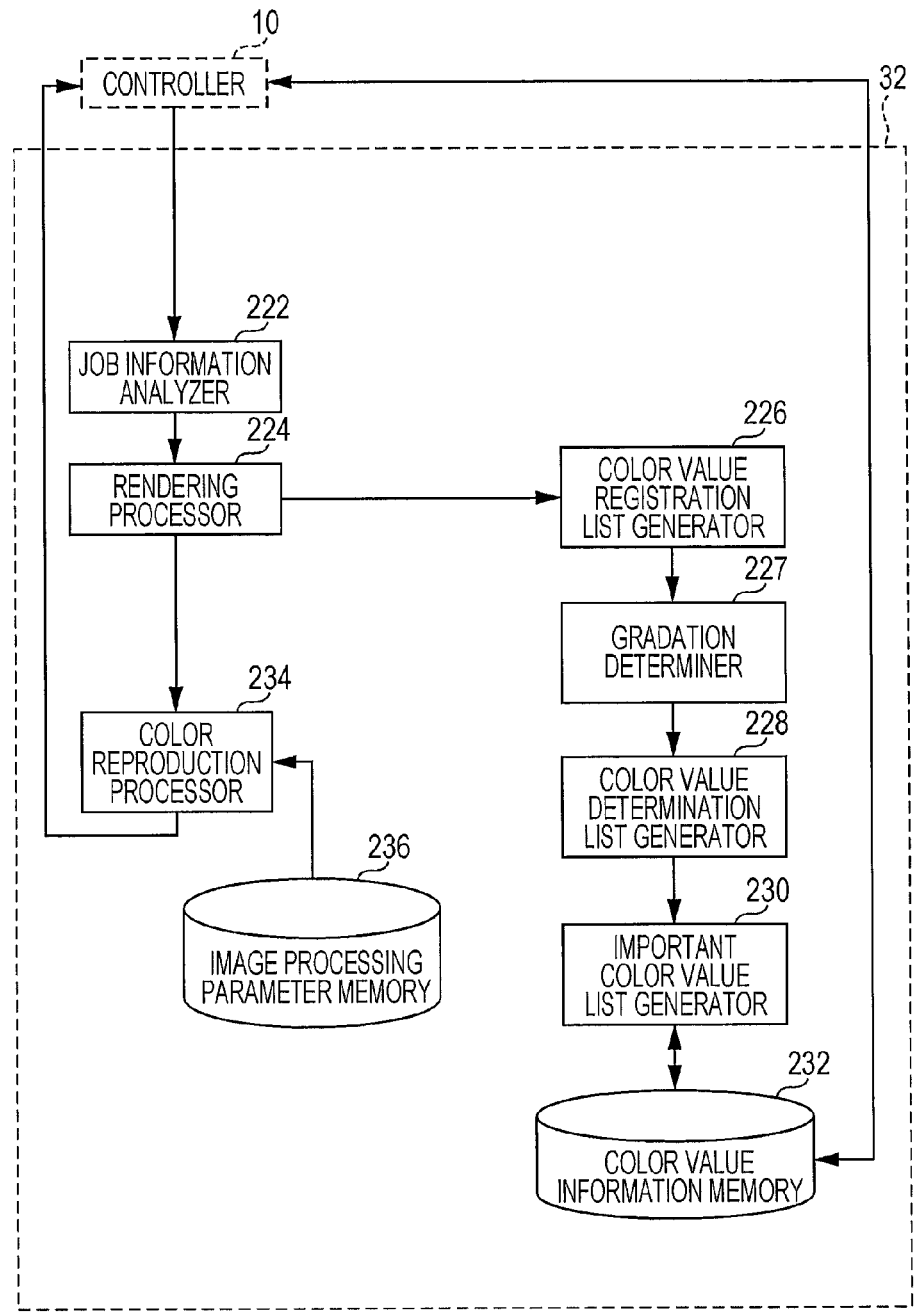
FIG. 28 is a block diagram illustrating a functional configuration of an image processor according to a fifth exemplary embodiment of the invention.

Next, an image processing system according to the fifth exemplary embodiment of the invention will be described. FIG. 28 illustrates an example of the configuration of an image processor according to the fifth exemplary embodiment of the invention. As illustrated in FIG. 28, the image processor 32 according to the fifth exemplary embodiment includes the job information analyzer 222, the rendering processor 224, the color value registration list generator 226, a gradation determiner 227, the color value determination list generator 228, the important color value list generator 230, the color value information memory 232, the color reproduction processor 234, and the image processing parameter memory 236.

Figure 29:
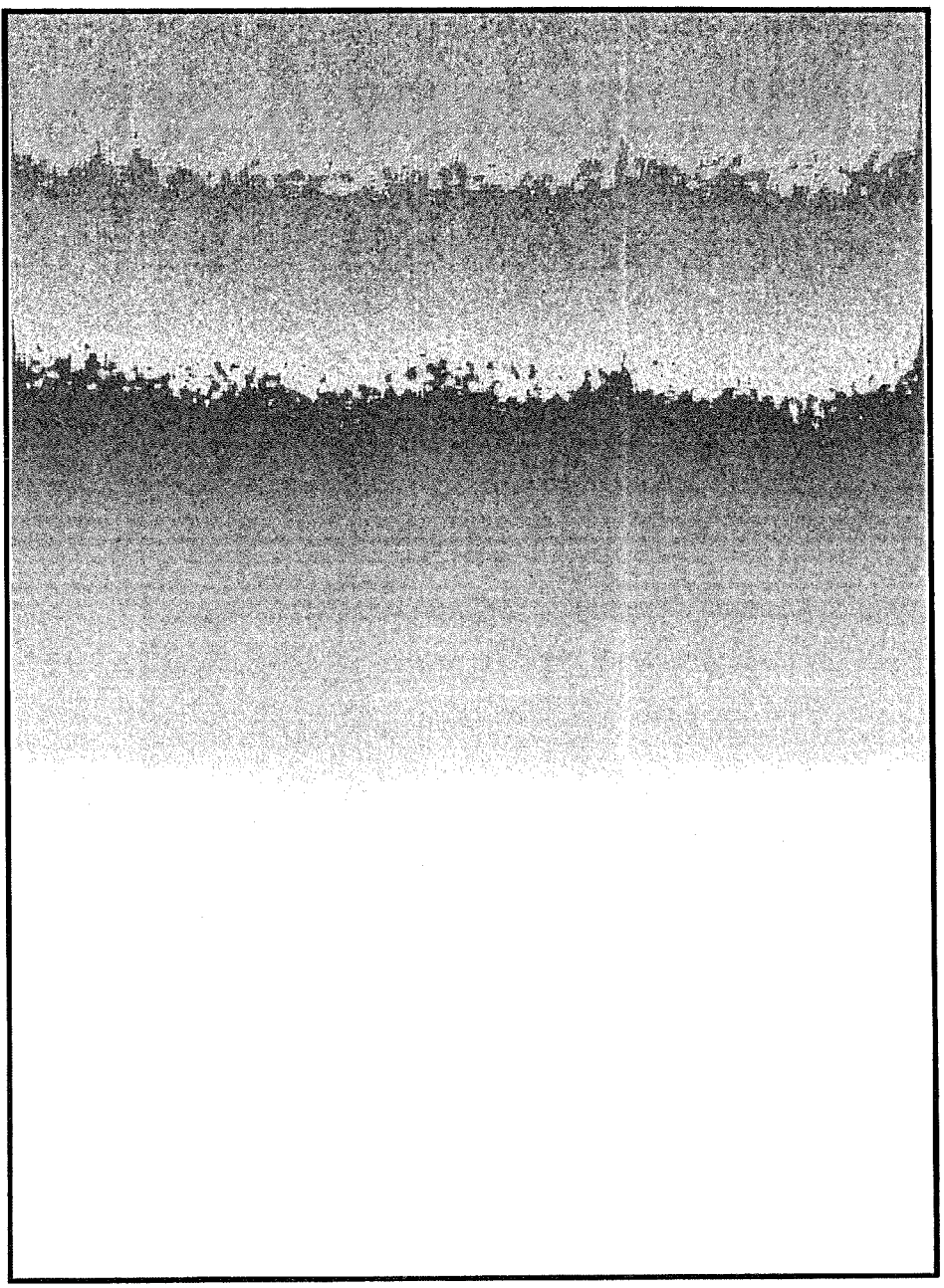
FIG. 29 illustrates an example of gradation.
Figures 30, 31:
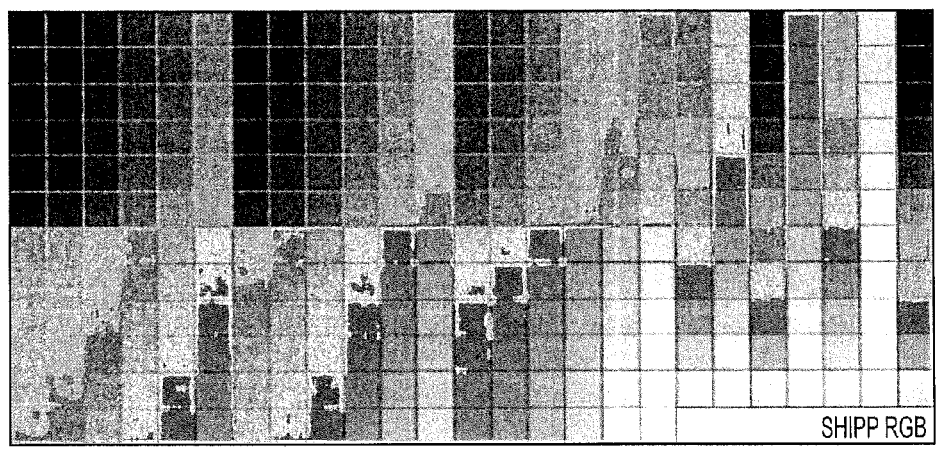
FIG. 30 illustrates an example of physical chart.
FIG. 31 illustrates an example in which entries for color values representing gradation are stored in a color value registration list.

The gradation determiner 227 determines, for each page, whether or not the page in question includes color values representing color gradation as illustrated in FIG. 29 or FIG. 30, on the basis of each individual color value registration list generated for each page in the color value registration list generator 226. Specifically, with respect to each individual color value registration list generated for each page in the color value registration list generator 226, in a case where the on-page frequencies of all of or a predetermined number or more of entries in the color value registration list are the same as illustrated in FIG. 31, the gradation determiner 227 determines that the page in question includes color values representing color gradation.

The color value determination list generator 228 generates a color value determination list on the basis of a color value registration list generated in the color value registration list generator 226 for each page in an output instruction as illustrated in FIG. 8. The color value determination list is generated with respect to each individual color value registration list for each page which is determined in the gradation determiner 227 as not including color values representing color gradation.

<Color Value Log Acquisition Processing According to Fifth Exemplary Embodiment>

Figure 32:
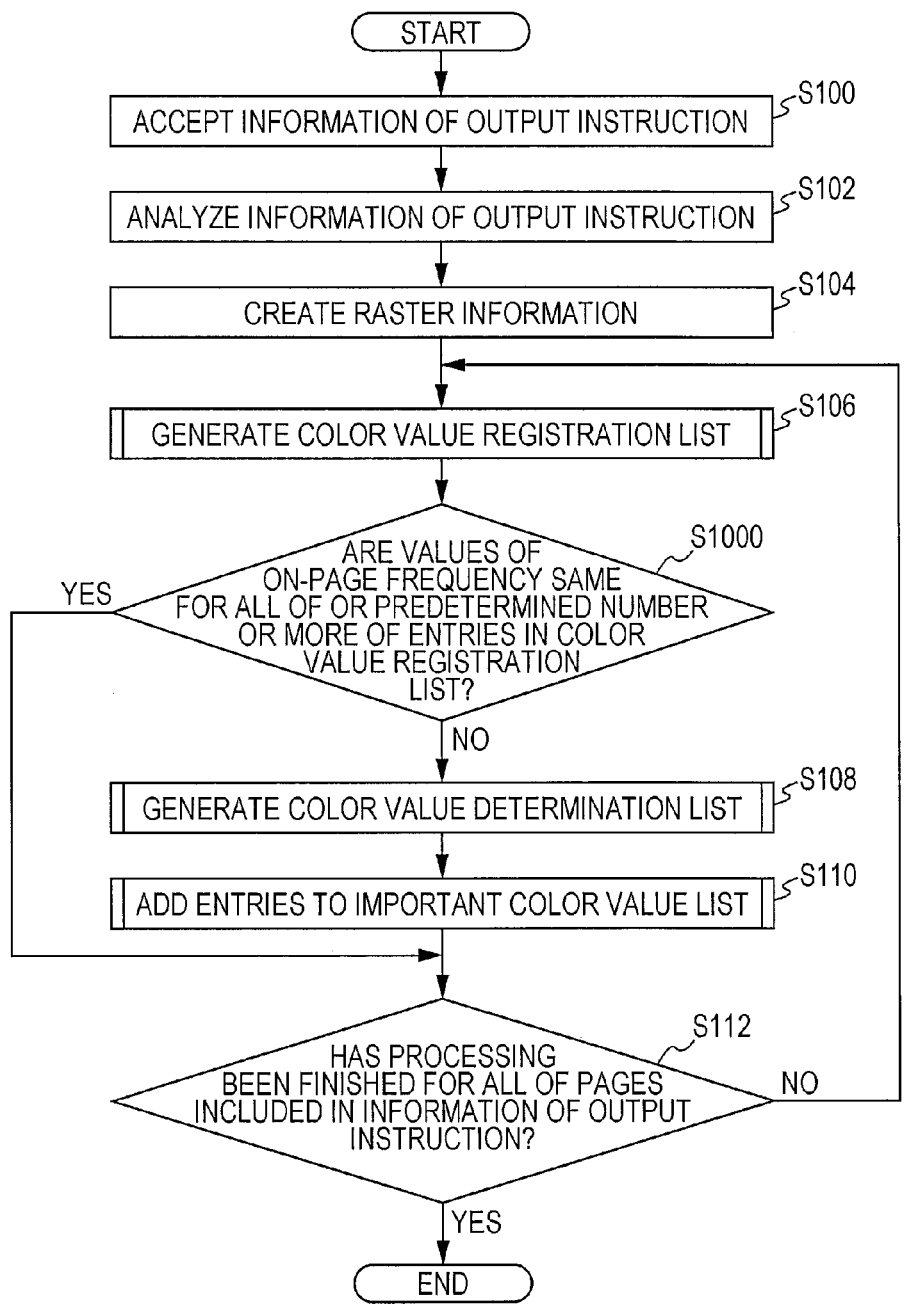
FIG. 32 is a flowchart illustrating a color value log acquisition processing routine in the image processor according to the fifth exemplary embodiment of the invention.

Next, "color value log acquisition processing" executed by the image processor 32 according to the fifth exemplary embodiment of the invention will be described. FIG. 32 is a flowchart illustrating an example of the processing routine for "color value log acquisition processing". A control program for "color value log acquisition processing" is read from the memory 42, and executed by the CPU 12. The control program for "color value log acquisition processing" is started in the image processor 32 when an output instruction is acquired via the communication section 44 from the external apparatus 50.

In step S1000, it is determined whether or not the on-page frequencies of all of or a predetermined number or more of entries stored in the color value registration list acquired in step S106 are the same. In a case where the on-page frequencies of all of or a predetermined number or more of the entries are the same, the processing transfers to step S112, and in a case where the on-page frequencies of all of or a predetermined number or more of the entries are not the same, the processing transfers to step S108.

As described above, the image processing system according to the fifth exemplary embodiment extracts important colors on pages included in an output instruction, while minimizing an increase in the size of the memory area.

Next, a sixth exemplary embodiment will be described. Portions that are configured and operate in the same manner as in the first exemplary embodiment are denoted by the same symbols and a description of these portions is omitted.

The sixth exemplary embodiment differs from the first exemplary embodiment in that the color values of image information which represent gradation are excluded from a color value log.

<Configuration of Image Processing System According to Sixth Exemplary Embodiment>

Figure 33:
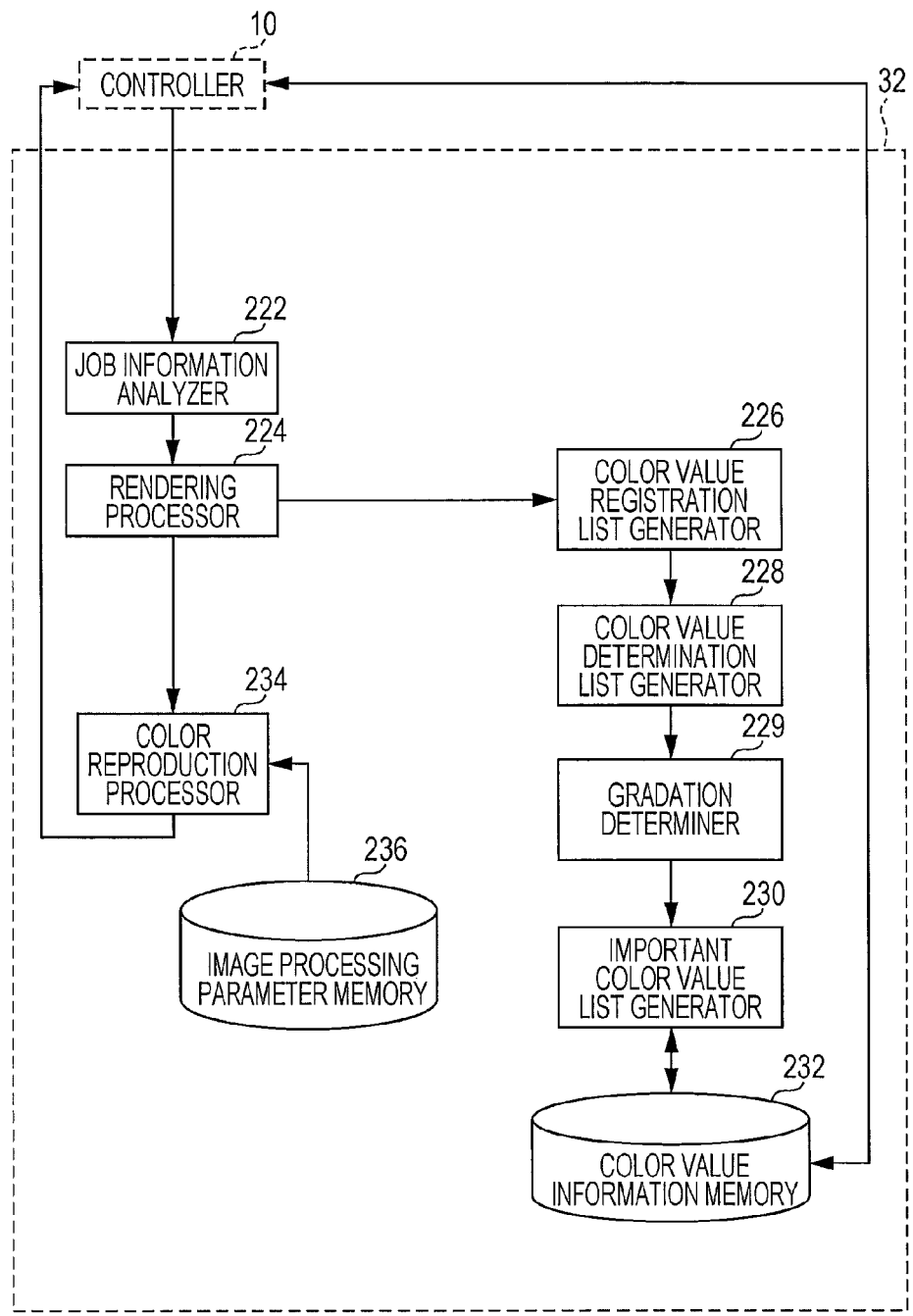
FIG. 33 is a block diagram illustrating a functional configuration of an image processor according to a sixth exemplary embodiment of the invention.

Next, an image processing system according to the sixth exemplary embodiment of the invention will be described. FIG. 33 illustrates an example of the configuration of an image processor according to the sixth exemplary embodiment of the invention. As illustrated in FIG. 33, the image processor 32 according to the sixth exemplary embodiment includes the job information analyzer 222, the rendering processor 224, the color value registration list generator 226, the color value determination list generator 228, a gradation determiner 229, the important color value list generator 230, the color value information memory 232, the color reproduction processor 234, and the image processing parameter memory 236.

On the basis of color value determination lists for individual pages generated in the color value determination list generator 228, the gradation determiner 229 determines for each page whether or not the page in question includes color values representing color gradation. Specifically, with respect to each individual color value determination list generated for each page in the color value determination list generator 228, in a case where the number of entries in the color value determination list in question is N that is an upper limit on the number of entries for the color value registration list, the gradation determiner 229 determines that the page in question includes color values representing color gradation.

The important color value list generator 230 generates an important color value list, on the basis of each color value determination list for each page which is generated in the color value determination list generator 228 and determined by the gradation determiner 229 as not including color values representing color gradation.

<Color Value Log Acquisition Processing According to Sixth Exemplary Embodiment>

Figure 34:
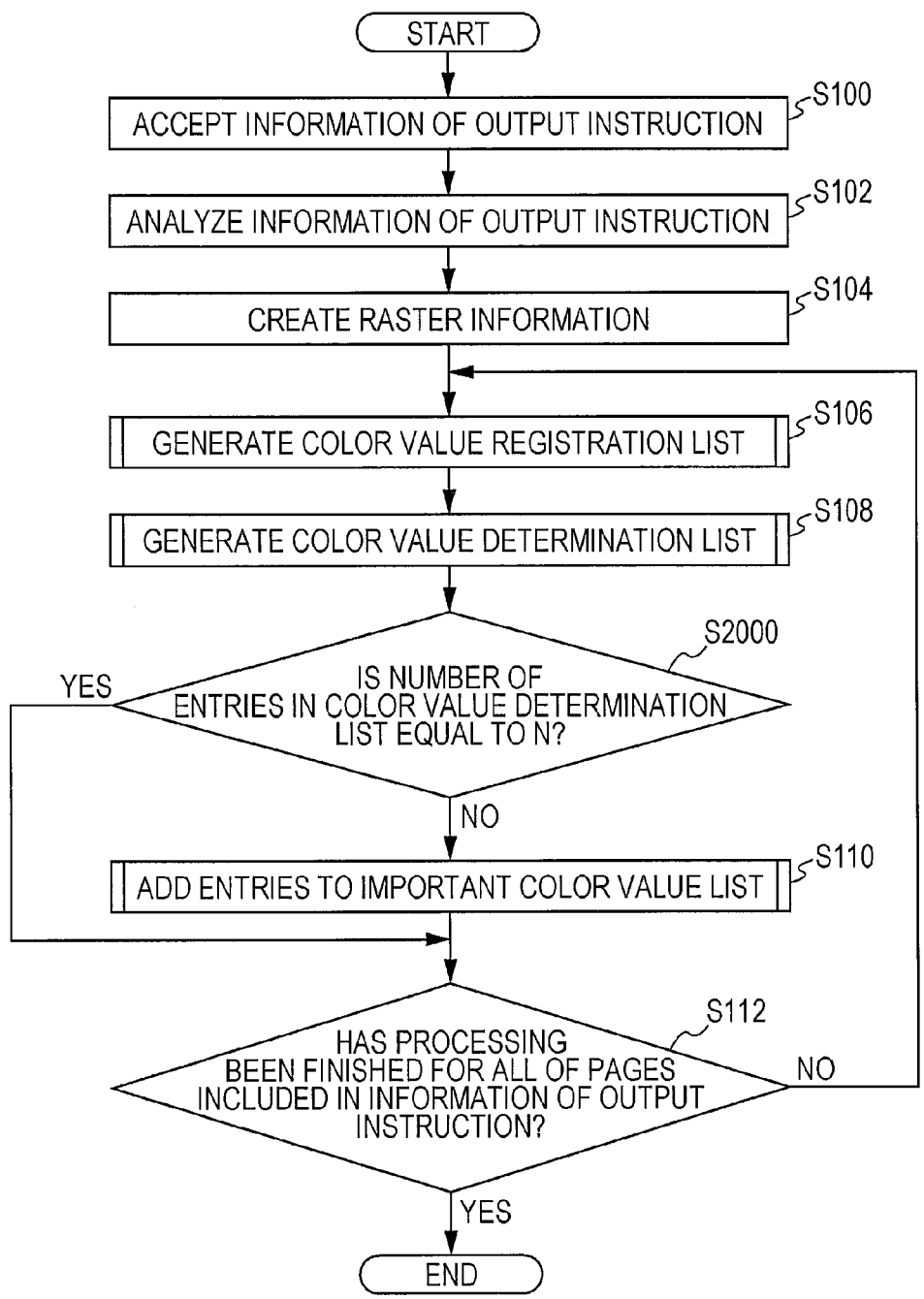
FIG. 34 is a flowchart illustrating a color value log acquisition processing routine in the image processor according to the sixth exemplary embodiment of the invention.

Next, "color value log acquisition processing" executed by the image processor 32 according to the sixth exemplary embodiment of the invention will be described. FIG. 34 is a flowchart illustrating an example of the processing routine for "color value log acquisition processing". A control program for "color value log acquisition processing" is read from the memory 42, and executed by the CPU 12. The control program for "color value log acquisition processing" is started in the image processor 32 when an output instruction is acquired via the communication section 44 from the external apparatus 50.

In step S2000, it is determined whether or not the number of entries stored in the color value determination list acquired in step S108 is N. In a case where N entries exist in the color value determination list, the processing transfers to step S112, and in a case where the number of entries stored in the color value determination list is less than N, the processing transfers to step S108.

As described above, the image processing system according to the sixth exemplary embodiment extracts important colors on pages included in an output instruction, while minimizing an increase in the size of the memory area.

Next, a seventh exemplary embodiment will be described. Portions that are configured and operate in the same manner as in the first exemplary embodiment are denoted by the same symbols and a description of these portions is omitted.

The seventh exemplary embodiment differs from the first exemplary embodiment in that an important color value list is generated for each user on the basis of user information added to image information.

<Configuration of Image Processor According to Seventh Exemplary Embodiment>

The important color value list generator 230 generates, for each user information, an important color value list for the user information in question, on the basis of each color value determination list generated in the color value determination list generator 228 on the basis of image information to which the user information is added. The important color value list is an example of second color value registration list, and the user information is an example of additional information.

The color value information memory 232 stores color value registration lists for individual pages which are generated in the color value registration list generator 226, color value determination lists for individual color value registration lists which are generated in the color value determination list generator 228, and important color value lists for individual users which are generated in the important color value list generator 230.

<Color Value Log Acquisition Processing According to Seventh Exemplary Embodiment>

Next, "color value log acquisition processing" executed by the image processor 32 according to the seventh exemplary embodiment of the invention will be described. FIG. 11 is a flowchart illustrating an example of the processing routine for "color value log acquisition processing". A control program for "color value log acquisition processing" is read from the memory 42, and executed by the CPU 12. The control program for "color value log acquisition processing" is started in the image processor 32 when an output instruction is acquired via the communication section 44 from the external apparatus 50.

Step S110 mentioned above is implemented by the important color value list addition processing routine illustrated in FIG. 14.

In step S400, on the basis of user information added to the image information of an accepted output instruction, an important color value list for the user information is read from the color value information memory 232. In a case where an important color value list for the user information added to the image information of an accepted output instruction is not stored in the color value information memory 232, an important color value list for the user information is generated anew.

As described above, the image processing system according to the seventh exemplary embodiment extracts, for each user, important colors on pages included in an output instruction, while minimizing an increase in the size of the memory area.

Next, an eighth exemplary embodiment will be described. Portions that are configured and operate in the same manner as in the second exemplary embodiment are denoted by the same symbols and a description of these portions is omitted.

The eighth exemplary embodiment differs from the second exemplary embodiment in that an extracting important color value list is generated for each user on the basis of user information added to image information.

<Configuration of Image Processing System According to Eighth Exemplary Embodiment>

The extracting important color value list generator 326 generates, for each user information, an extracting important color value list for the user information in question. The extracting important color value list is generated on the basis of an extracting color value determination list generated in the extracting color value determination list generator 324 on the basis of image information to which the user information in question is added. The extracting important color value list is an example of fourth color value registration list, and the user information is an example of additional information.

The color value information memory 328 stores extracting color value registration lists generated in the extracting color value registration list generator 322, extracting color value determination lists generated in the extracting color value determination list generator 324, and extracting important color value lists for individual users generated in the extracting important color value list generator 326. The color value information memory 328 also stores color value extraction lists in which entries corresponding to the color value/attribute pairs to be extracted are stored.

<Color Value Log Acquisition Processing According to Eighth Exemplary Embodiment>

Next, "color value log acquisition processing" executed by the image processor 32 according to the eighth exemplary embodiment of the invention will be described. FIG. 21 is a flowchart illustrating an example of the processing routine for "color value log acquisition processing". A control program for "color value log acquisition processing" is read from the memory 42, and executed by the CPU 12. The control program for "color value log acquisition processing" is started in the image processor 32 when an output instruction is acquired via the communication section 44 from the external apparatus 50.

Step S508 is implemented by the extracting important color value list addition processing routine illustrated in FIG. 24.

In step S800, on the basis of user information added to the image information of an accepted output instruction, an extracting important color value list for the user information is read from the color value information memory 328. In a case where an extracting important color value list for the user information added to the image information of an accepted output instruction is not stored in the color value information memory 328, an extracting important color value list for the user information is generated anew.

As described above, the image processing system according to the eighth exemplary embodiment extracts, for each user, the frequencies of specific colors on pages included in an output instruction, while minimizing an increase in the size of the memory area.

The invention is not limited to the exemplary embodiments mentioned above, but various modifications and applications are possible without departing from the scope of the invention.

In the fifth exemplary embodiment, color values representing gradation are regarded as having been detected in a case where the on-page frequencies of all of or a predetermined number or more of entries in a color value registration list are the same. However, this is not to be construed restrictively. For example, as illustrated in FIG. 31, in a case where there is no unbalance in the values of on-page frequency of entries in a color value registration list, it may be determined that color gradation is formed by the color values of the entries with no unbalance in their frequency. Further, in a case where H's obtained upon converting the RGB values of entries in a color value registration list into HSL signals are the same for all of the color values (in the case of gradation of red, H=0 for all of the color values), the page in question may be regarded as including color gradation.

In the fifth exemplary embodiment mentioned above, in a case where it is determined on the basis of a color value registration list that color gradation is included, entries in the color value registration list for the corresponding page are not added to the color value determination list. However, this is not to be construed restrictively. For example, in a case where it is determined on the basis of a color value registration list that color gradation is included, among the entries in the color value registration list, those entries with values of on-page frequency larger than the values of on-page frequency of entries corresponding to color gradation may be added to the color value determination list.

In the first to fifth exemplary embodiments mentioned above, in a case where all of the pixels included in a detection window have the same matching color value/attribute pair, an entry corresponding to this color value/attribute pair is added to the color value registration list or extracting color value registration list. However, this is not to be construed restrictively. For example, in a case where all of the pixels included in a detection window have the same matching color value, an entry corresponding to this color value may be added to the color value registration list or extracting color value registration list. In this case, attribute information is not included in the color value registration list, the extracting color value registration list, the color value determination list, the extracting color value determination list, the important color value list, and the extracting important color value list.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a first color value registration list generating section that generates a first color value registration list, on a basis of color values of individual pixels of inputted image information in a case where a predetermined number or more of consecutive pixels have color values that match each other, the first color value registration list registering, for each of the color values that match, first color value information that includes the color value and a frequency of the color value.

2. The image processing apparatus according to claim 1, wherein:
the first color value registration list generating section generates the first color value registration list for each individual piece of inputted image information; and
the image processing apparatus further comprises a second color value registration list generating section, the second color value registration list generating section generating a second color value registration list on a basis of the first color value registration list that is generated for each individual piece of the inputted image information by the first color value registration list generating section, the second color value registration list registering, for each of color values of which the frequency of the color value stored in the first color value registration list is higher than or equal to a predetermined value, second color value information that includes the color value and the number of the first color value registration lists in which the frequency of the color value is higher than or equal to the predetermined value.

3. The image processing apparatus according to claim 1, wherein:
the first color value registration list generating section determines whether or not the predetermined number or more of consecutive pixels each have a matching color value while scanning each of the pixels of the inputted image information; and
in a case where the first color value registration list generating section determines that the predetermined number or more of consecutive pixels each have a matching color value, and the number of pieces of the first color value information registered in the first color value registration list is a predetermined upper limit number and the first color value information including the matching color value is not registered in the first color value registration list, the first color value registration list generating section deletes the first color value information of which the frequency corresponds to the lowest frequency among the pieces of the first color value information registered in the first color value registration list, and registers the first color value information including the matching color value and a frequency of the matching color value into the first color value registration list.

4. The image processing apparatus according to claim 1, wherein:
the first color value registration list generating section determines whether or not the predetermined number or more of consecutive pixels each have a matching color value while scanning each of the pixels of the inputted image information; and
in a case where the first color value registration list generating section determines that the predetermined number or more of consecutive pixels each have a matching color value, and the number of pieces of the first color value information registered in the first color value registration list is a predetermined upper limit number and the first color value information including the matching color value is not registered in the first color value registration list, the first color value registration list generating section deletes the first color value information corresponding to the oldest registered first color value information among the pieces of the first color value information registered in the first color value registration list, and registers the first color value information including the matching color value and a frequency of the matching color value into the first color value registration list.

5. The image processing apparatus according to claim 1, wherein in a case where color values of the predetermined number or more of consecutive pixels match within a predetermined range of color values, the first color value registration list generating section registers the first color value information for each of the color values that match within the predetermined range of color values.

6. The image processing apparatus according to claim 1, wherein:
the image information includes attribute information for each individual pixel; and
the first color value registration list generating section generates the first color value registration list, on a basis of color values of individual pixels of the inputted image information in a case where the predetermined number or more of consecutive pixels have pairs of the color value and the attribute information that match each other, the first color value registration list registering, for each of the pairs of the color value and the attribute information that match, the first color value information that includes the color value, the attribute information, and a frequency of the pair.

7. The image processing apparatus according to claim 2, further comprising:
a determining section that determines whether or not color gradation is included with respect to each individual piece of the inputted image information, on a basis of the first color value registration list; and
the second color value registration list generating section generates the second color value registration list for each individual piece of image information that is determined by the determining section as not including color gradation.

8. The image processing apparatus according to claim 6, wherein the first color value registration list generating section generates the first color value registration list, in a case where the predetermined number or more of consecutive pixels have pairs of the color value and the attribute information that match each other and the attribute information matches predetermined attribute information, the first color value registration list registering, for each of the pairs of the color value and the attribute information that match, the first color value information that includes the color value, the attribute information, and a frequency of the pair.

9. The image processing apparatus according to claim 2, wherein:
the inputted image information includes additional information that is added in advance; and
the second color value registration list generating section generates the second color value registration list for each of classifications related to the additional information, on a basis of the first color value registration list generated with respect to each individual piece of the image information to which the additional information belonging to each of the classifications is added.

10. The image processing apparatus according to claim 2, further comprising a third color value registration list generating section, the third color value registration list generating a third color value registration list, on a basis of color values of individual pixels of inputted image information in a case where, with respect to each of individual target color values, the target color values match for the predetermined number or more of consecutive pixels, the target color values being individual color values stored in the second color value registration list generated by the second color value registration list generating section, the third color value registration list registering, for each of the target color values that match, the third color value information that includes the color value and a frequency of the color value.

11. The image processing apparatus according to claim 10, wherein:
the third color value registration list generating section generates the third color value registration list for each individual piece of inputted image information; and
the image processing apparatus further comprises a fourth color value registration list generating section, the fourth color value registration list generating section generating a fourth color value registration list on a basis of the third color value registration list that is generated for each individual piece of the image information by the third color value registration list generating section, the fourth color value registration list registering, for each of color values of which the frequency of the color value stored in the third color value registration list is higher than or equal to a predetermined value, fourth color value information that includes the color value and the number of the third color value registration lists in which the frequency of the color value is higher than or equal to the predetermined value.

12. An image processing apparatus comprising:
a third color value list generating section that generates a third color value registration list on a basis of color values of individual pixels of inputted image information in a case where, with respect to each of target color values that are determined in advance, the target color values match for a predetermined number or more of consecutive pixels, the third color value registration list registering, for each of the target color values that match, third color value information that includes the color value and a frequency of the color value.

13. The image processing apparatus according to claim 12, wherein:
the third color value registration list generating section generates the third color value registration list for each individual piece of inputted image information; and
the image processing apparatus further comprises a fourth color value registration list generating section, the fourth color value registration list generating a fourth color value registration list on a basis of the third color value registration list that is generated for each individual piece of the image information by the third color value registration list generating section, the fourth color value registration list registering, for each of color values of which the frequency of the color value stored in the third color value registration list is higher than or equal to a predetermined value, fourth color value information that includes the color value and the number of the third color value registration lists in which the frequency of the color value is higher than or equal to the predetermined value.

14. The image processing apparatus according to claim 10, wherein:
the image information includes attribute information for each individual pixel; and
the third color value registration list generating section generates the third color value registration list, on a basis of color values of individual pixels of the inputted image information in a case where the predetermined number or more of consecutive pixels have pairs of the color value and the attribute information that match each other, the third color value registration list registering, for each of the pairs of the color value and the attribute information that match, the third color value information that includes the color value, the attribute information, and a frequency of the pair.

15. The image processing apparatus according to claim 11, wherein:
the inputted image information includes additional information that is added in advance; and
the fourth color value registration list generating section generates the fourth color value registration list for each of classifications related to the additional information, on a basis of the third color value registration list generated with respect to each individual piece of the image information to which the additional information belonging to each of the classifications is added.

16. An image forming apparatus comprising:
the image processing apparatus according to claim 1; and
an image forming section that forms an image on a basis of the inputted image information.

17. The image forming apparatus according to claim 16, further comprising:
a converting section that converts the inputted image information into image information expressed in a color space of the image formed by the image forming section, wherein the image forming section forms the image on a basis of the image information converted by the converting section.

18. An image processing system comprising:
the image processing apparatus according to claim 1; and
an information processing terminal that transmits the image information to the image processing apparatus by a communication section.

19. An image processing method comprising:
generating a first color value registration list on a basis of color values of individual pixels of inputted image information, in a case where a predetermined number or more of consecutive pixels have color values that match each other, the first color value registration list registering, for each of the color values that match, first color value information that includes the color value and a frequency of the color value.

* * * * *